United States Patent
Kamata et al.

(10) Patent No.: US 11,068,101 B2
(45) Date of Patent: Jul. 20, 2021

(54) ELECTRONIC DEVICE INCLUDING VIBRATING ELEMENT FOR GENERATING VIBRATION IN OPERATION SURFACE OF TOP PANEL

(71) Applicant: FUJITSU LIMITED, Kawasaki (JP)

(72) Inventors: Yuichi Kamata, Isehara (JP); Akinori Miyamoto, Sagamihara (JP); Yoshihiro Mizuno, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/912,571

(22) Filed: Jun. 25, 2020

(65) Prior Publication Data
US 2020/0326809 A1  Oct. 15, 2020

Related U.S. Application Data

(63) Continuation of application No. PCT/JP2017/047040, filed on Dec. 27, 2017.

(51) Int. Cl.
*G06F 3/041* (2006.01)
*G06F 3/01* (2006.01)

(52) U.S. Cl.
CPC ............ *G06F 3/0414* (2013.01); *G06F 3/016* (2013.01); *G06F 3/0412* (2013.01)

(58) Field of Classification Search
CPC ...... G06F 3/0414; G06F 3/016; G06F 3/0412; G06F 3/041–04897
See application file for complete search history.

(56) References Cited

U.S. PATENT DOCUMENTS

| | | |
|---|---|---|
| 2017/0090575 A1 | 3/2017 | Kohata et al. |
| 2018/0018022 A1* | 1/2018 | Hoshi ............... G06F 3/041 |

FOREIGN PATENT DOCUMENTS

| | | |
|---|---|---|
| JP | 2006-139371 | 6/2006 |
| JP | 2017-68709 | 4/2017 |
| JP | 2017-97611 | 6/2017 |
| WO | 2016/157491 A1 | 10/2016 |

OTHER PUBLICATIONS

International Search Report for PCT/JP2017/047040 dated Feb. 13, 2018.
Written Opinion of the International Searching Authority for PCT/JP2017/047040 dated Feb. 13, 2018.
Office Action of Japanese Patent Application No. 2019-561494 dated Feb. 9, 2021 with Full Machine translation.

\* cited by examiner

*Primary Examiner* — Temesghen Ghebretinsae
*Assistant Examiner* — Ivelisse Martinez Quiles
(74) *Attorney, Agent, or Firm* — Maschoff Brennan

(57) ABSTRACT

An electronic device includes: a top panel having an operation surface; a position detection circuit configured to detect a position of an operational input performed on the operation surface; a vibrating element mounted to the top panel and configured to generate vibration in the operation surface; and a drive control circuit configured to drive the vibrating element by a drive signal for generating natural vibration in an ultrasonic band in the operation surface, and configured to drive the vibrating element such that intensity of the natural vibration changes according to the position of the operational input on the operation surface and a degree of temporal change of the position.

5 Claims, 18 Drawing Sheets

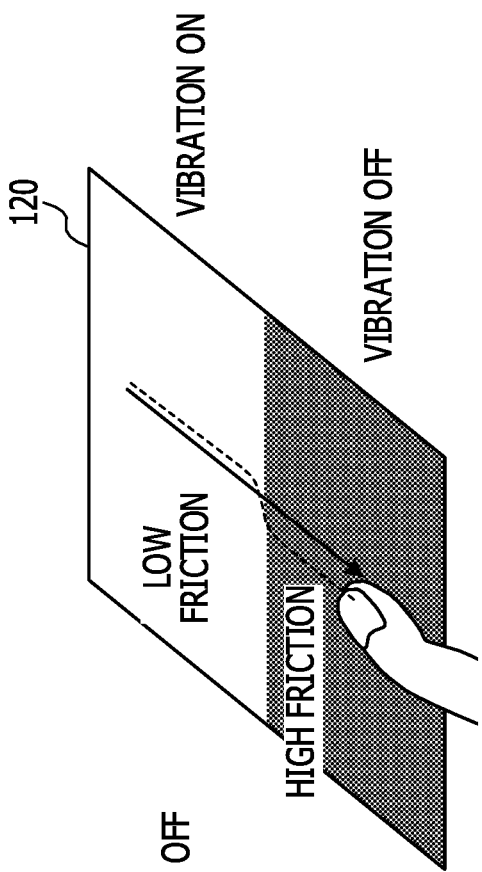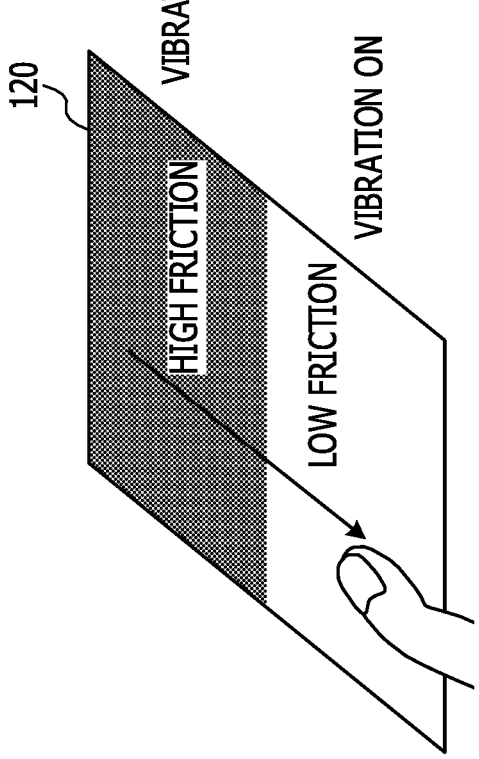

FIG. 7

| APPLICATION ID | AREA DATA | VIBRATION PATTERN |
|---|---|---|
| 1 | f1=(X,Y) | P1 |
| 1 | f2=(X,Y) | P2 |
| 1 | f3=(X,Y) | P3 |
| 1 | f4=(X,Y) | P4 |

FIG. 14
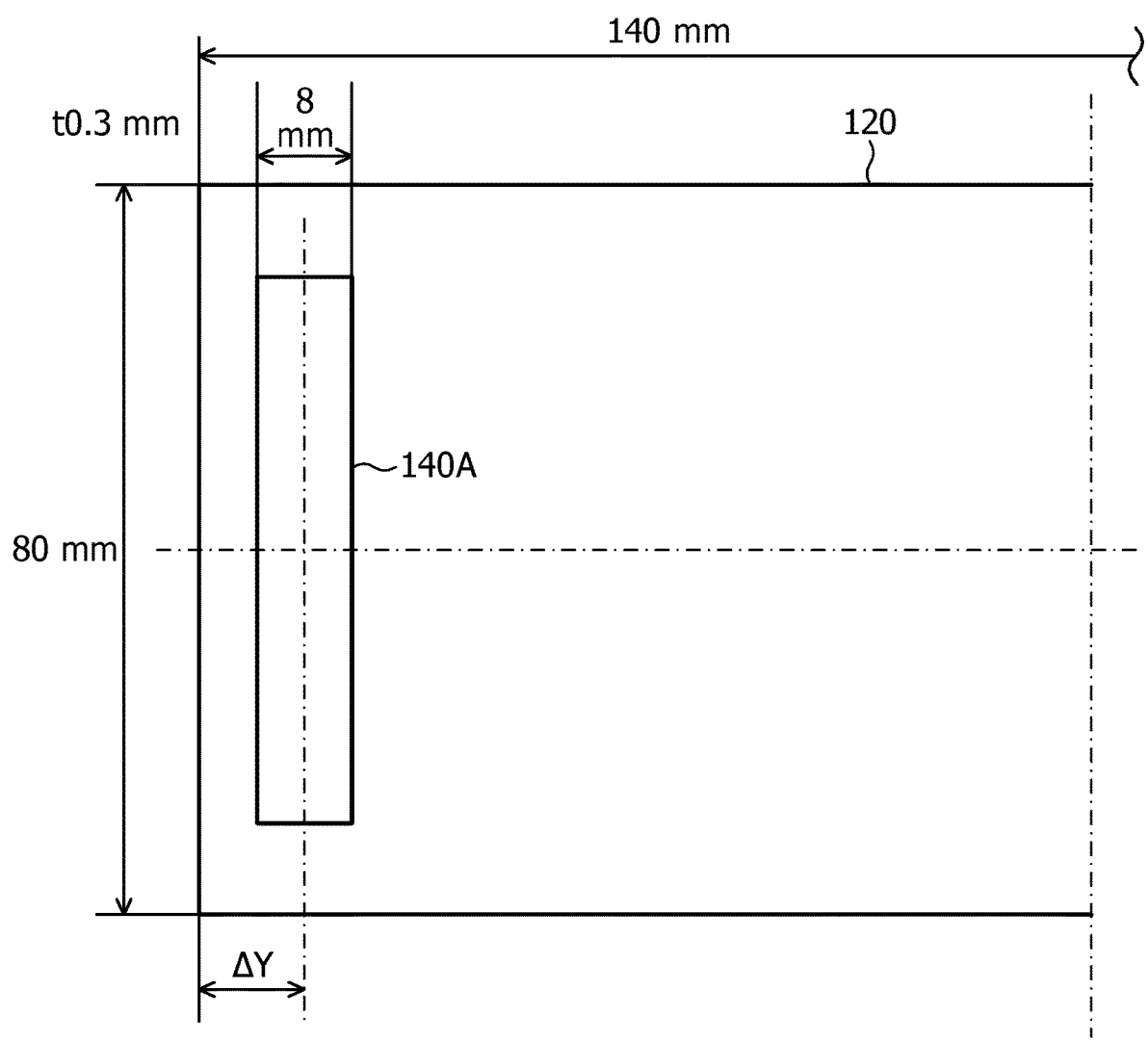
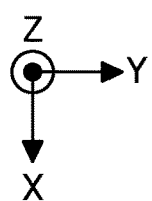

FIG. 18
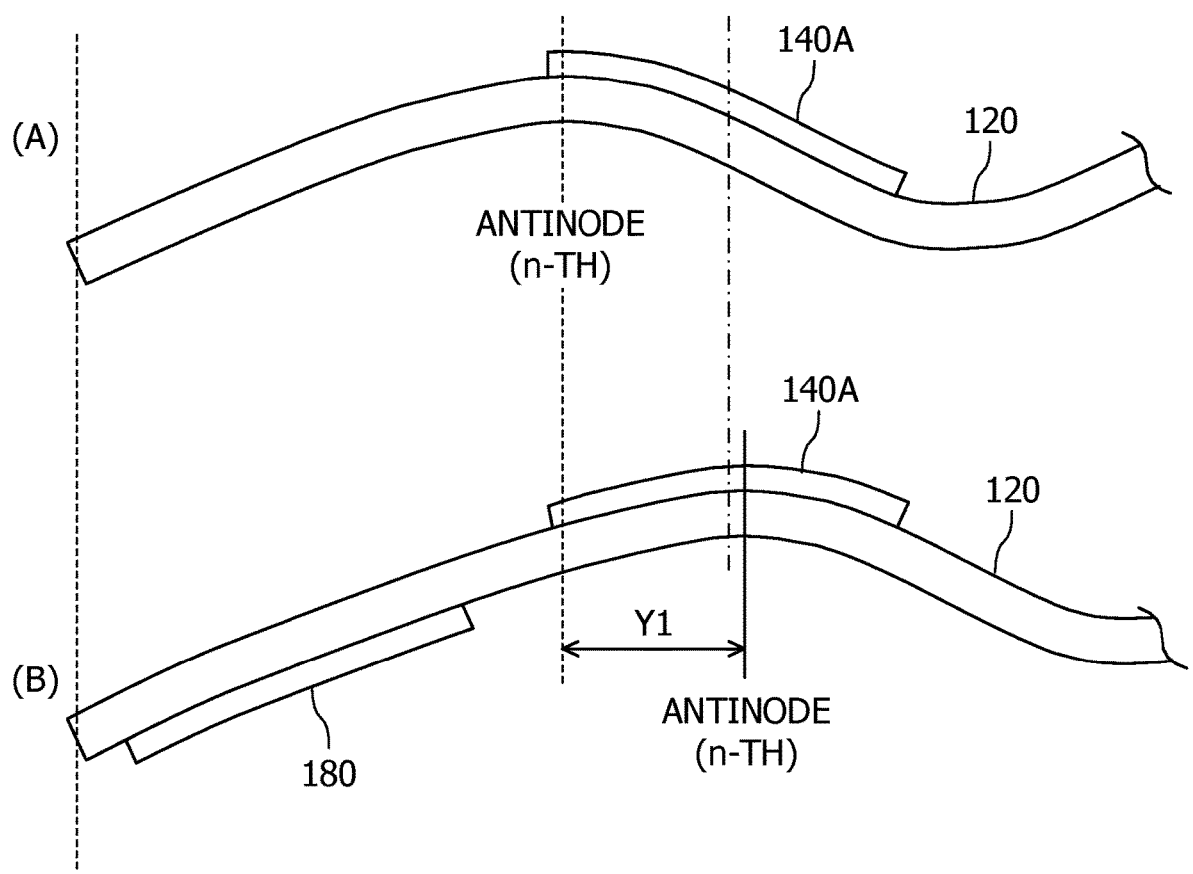
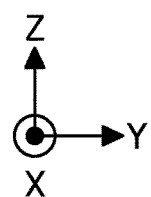

ELECTRONIC DEVICE INCLUDING VIBRATING ELEMENT FOR GENERATING VIBRATION IN OPERATION SURFACE OF TOP PANEL

CROSS-REFERENCE TO RELATED APPLICATION

This application is a continuation application of International Application PCT/JP2017/047040 filed on Dec. 27, 2017 and designated the U.S., the entire contents of which are incorporated herein by reference.

FIELD

The embodiment relates to an electronic device.

BACKGROUND

There is an input device including a housing having an opening, a detecting means having a front panel exposed through the opening and for detecting a pressing operation when the front panel is pressed, an excitation means for vibrating the front panel, a driving means for generating a drive signal for driving the excitation means at a predetermined frequency, and a control means for providing an activation signal for activating the driving means in response to an output from the detecting means.

Related art is disclosed in Japanese Laid-open Patent Publication No. 2006-139371.

SUMMARY

According to an aspect of the embodiments, an electronic device includes: a top panel having an operation surface; a position detection circuit configured to detect a position of an operational input performed on the operation surface; a vibrating element mounted to the top panel and configured to generate vibration in the operation surface; and a drive control circuit configured to drive the vibrating element by a drive signal for generating natural vibration in an ultrasonic band in the operation surface, and configured to drive the vibrating element such that intensity of the natural vibration changes according to the position of the operational input on the operation surface and a degree of temporal change of the position, wherein a position of the vibrating element mounted to the top panel is offset on an outer side of the top panel with respect to a position of an antinode included in one section of sections of a plurality of cycles respectively including a plurality of antinodes of a standing wave generated in the top panel by the natural vibration, and an amount of the offset is equal to or less than Y−d, where a distance from an end on the outer side of the top panel to the antinode included in the one section is Y, an error of a mounting position in a case where the vibrating element is arranged on the outer side with respect to the antinode included in the one section is −d, and an error of a mounting position in a case where the vibrating element is arranged on an inner side opposite to the outer side with respect to the antinode included in the one section is +d.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 5A and 5B are a diagram for describing a state in which a dynamic friction force applied to a fingertip performing an operational input changes due to the natural vibration in the ultrasonic band generated in the top panel of the electronic device.

FIG. 7 is a table illustrating data to be stored in a memory.

FIG. 14 is a plan view illustrating an end portion on the Y-axis negative direction side of the top panel.

FIG. 18 is a diagram illustrating natural vibration in an end portion on a Y-axis negative direction side to which a vibrating element is mounted, of a top panel, in a modification of the embodiment.

DESCRIPTION OF EMBODIMENTS

The detecting means may be supported by a support provided at an edge of the opening, and may have a free end outside the support, and the excitation means is provided at the free end.

For example, the excitation means may be arranged at a position near an antinode of a vibration waveform of the detecting means.

By the way, the vibration efficiency may decrease if the excitation means (vibrating element) is attached closer to the center of the front panel than to an antinode of the vibration waveform in a direction where antinodes and nodes of vibration are generated in the front panel. When the vibration efficiency decreases, the amplitude of the vibration generated in the front panel becomes small and there is a possibility that a favorable tactile property cannot be provided.

Therefore, an electronic device capable of providing a favorable tactile property may be provided.

Hereinafter, an embodiment to which an electronic device of the present invention is applied will be described.

Embodiment

Figure 1:
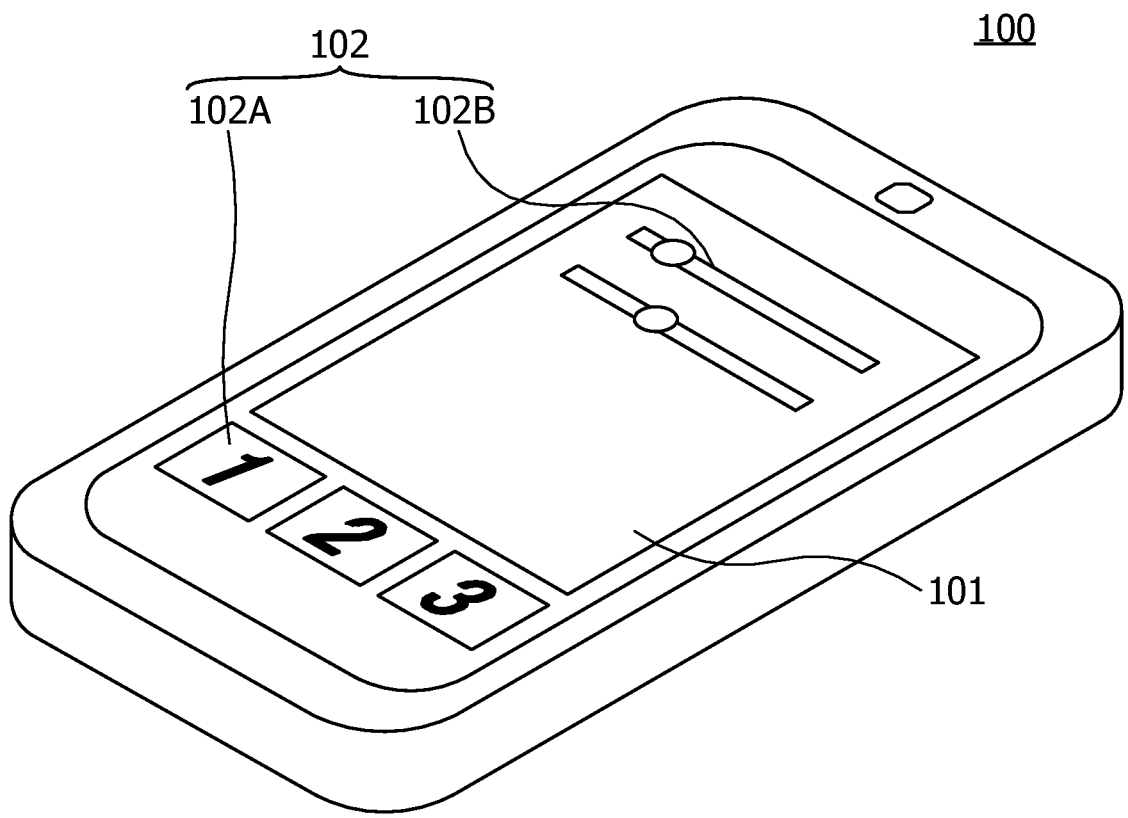
FIG. 1 is a perspective view illustrating an electronic device according to an embodiment.

FIG. 1 is a perspective view illustrating an electronic device 100 according to an embodiment.

Examples of the electronic device 100 include a smartphone terminal, a tablet computer, a game machine, and the like using a touch panel as an input operation unit. Since it is sufficient if the electronic device 100 is a device using a touch panel as an input operation unit, it may be, for example, a mobile information terminal, or a device installed and used at a specific place, such as an automatic teller machine (ATM). Furthermore, the electronic device 100 may be an in-vehicle input device.

The electronic device 100 includes an input operation unit 101 in which a display panel is disposed below the touch panel, and various buttons 102A, sliders 102B, or the like using a graphic user interface (GUI) (hereinafter referred to as GUI operation unit 102) are displayed on the display panel.

A user of the electronic device 100 normally touches the input operation unit 101 with his/her fingertip to operate the GUI operation unit 102.

Next, a specific configuration of the electronic device 100 will be described with reference to FIG. 2.

Figure 2:
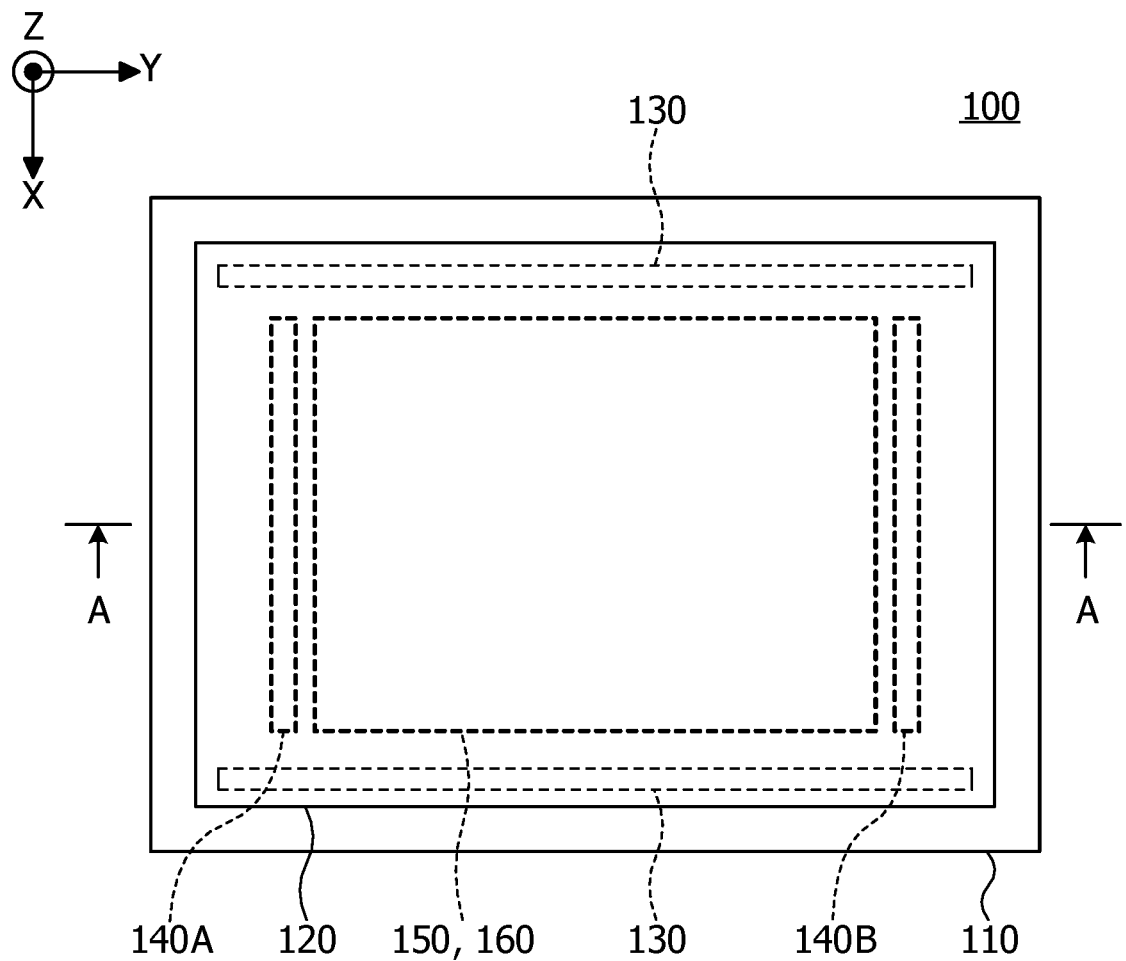
FIG. 2 is a plan view illustrating the electronic device according to the embodiment.
Figure 3:
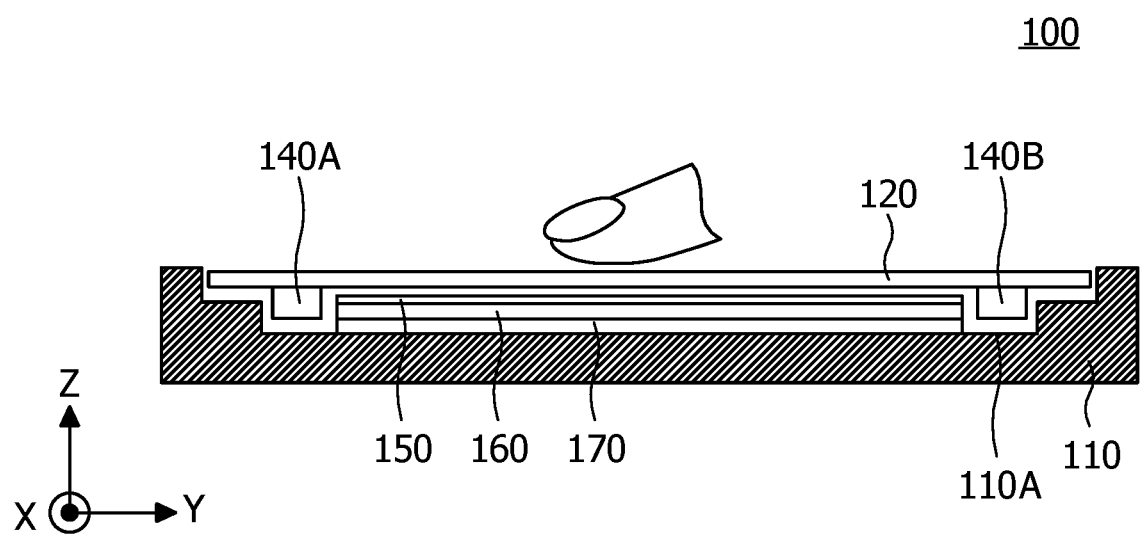
FIG. 3 is a view illustrating a cross section with arrows taken along line A-A of the electronic device illustrated in FIG. 2.

FIG. 2 is a plan view illustrating the electronic device 100 according to the embodiment, and FIG. 3 is a view illustrating a cross section with arrows taken along line A-A of the electronic device 100 illustrated in FIG. 2. Note that an XYZ coordinate system, which is an orthogonal coordinate system, is defined as illustrated in FIGS. 2 and 3.

The electronic device 100 includes a housing 110, a top panel 120, double-sided tapes 130, vibrating elements 140A and 140B, a touch panel 150, a display panel 160, and a substrate 170.

The housing 110 is made of, for example, resin, and as illustrated in FIG. 3, the substrate 170, the display panel 160, and the touch panel 150 are disposed in a recess 110A, and the top panel 120 is bonded by the double-sided tapes 130.

The top panel 120 is a thin tabular member that is rectangular in plan view, and is made of transparent glass or plastic, such as polycarbonate. A surface (surface on a Z-axis positive direction side) of the top panel 120 is an example of an operation surface on which the user of the electronic device 100 performs operational input.

The vibrating elements 140A and 140B are bonded to a surface on a Z-axis negative direction side of the top panel 120, and long sides of the top panel 120 in plan view are bonded to the housing 110 by the double-sided tapes 130. Note that the top panel 120 may not be a strict quadrilateral in plan view. For example, short sides of the top panel 120 on a Y-axis negative direction side and on a Y-axis positive direction side where the vibrating elements 140A and 140B are mounted may have a curved shape outward or inward in plan view.

The touch panel 150 is disposed on the Z-axis negative direction side of the top panel 120. The top panel 120 is provided to protect the surface of the touch panel 150. Note that another panel, a protective film, or the like may be further provided on the surface of the top panel 120.

The top panel 120 vibrates when the vibrating elements 140A and 140B are driven in the state where the vibrating elements 140A and 140B are bonded to the surface on the Z-axis negative direction side. In the embodiment, the top panel 120 is vibrated at a natural vibration frequency of the top panel 120 to generate standing waves in the top panel 120. Note that, since the vibrating elements 140A and 140B are bonded to the top panel 120, it is practically favorable to determine the natural vibration frequency in consideration of the weight of the vibrating elements 140A and 140B and the like.

The double-sided tapes 130 bond the long sides of the top panel 120 to the housing 110. The long sides of the top panel 120 are two sides extending along the Y axis on an X-axis positive direction side and on an X-axis negative direction side. Since the long sides are connected and the short sides are not connected by the double-sided tapes 130, when the top panel 120 is vibrated by the vibrating elements 140A and 140B, the two short-side sides (on the X-axis positive direction side and the X-axis negative direction side) become free ends and vibrate. Note that, here, a mode in which the two short-side sides of the top panel 120 are free ends is described. However, the two short sides may be fixed ends. For example, if the two short-side sides are fixed with the double-sided tapes 130 in addition to the two long-side sides of the top panel 120, the two short-side sides of the top panel 120 can be fixed ends.

The vibrating element 140A is bonded to the surface of the top panel 120 on the Z-axis negative direction side along the short side extending in the X-axis direction on the Y-axis negative direction side. The vibrating element 140B is bonded to the surface of the top panel 120 on the Z-axis negative direction side, along the short side extending in the X-axis direction on the Y-axis positive direction side. The vibrating elements 140A and 140B only need to be elements capable of generating vibration in an ultrasonic band, and an element including a piezoelectric element may be used, for example.

The vibrating elements 140A and 140B have an elongated rectangular shape (a strip shape or a rectangular shape) in plan view, and are disposed such that longitudinal directions of the vibrating elements 140A and 140B go along edge sides extending in the X-axis direction at ends in the Y-axis direction of the top panel 120. A standing wave with amplitude changing in the Y-axis direction is generated in the top panel 120. The vibrating elements 140A and 140B have the elongated rectangular shape having short sides in the Y-axis direction in order to reduce the influence of the natural vibration of the top panel 120 on a vibration mode. As an example, the length of the short sides is shorter than the length of a half cycle of the natural vibration.

The vibrating elements 140A and 140B are driven by a drive signal output from the drive control unit described below. The amplitude (intensity) and the frequency of vibration generated by the vibrating elements 140A and 140B are set by the drive signals. In addition, on/off of the vibrating elements 140A and 140B is controlled by the drive signals.

Note that the ultrasonic band refers to a frequency band of about 20 kHz or more, for example. In the electronic device 100 according to the embodiment, the frequency at which the vibrating elements 140A and 140B vibrate is equal to the frequency of the top panel 120, whereby the vibrating elements 140A and 140B are driven by the drive signals to vibrate at the natural frequency of the top panel 120.

The touch panel 150 is disposed on the display panel 160 (Z-axis positive direction side) and under the top panel 120 (Z-axis negative direction side). The touch panel 150 is an exemplary coordinate detection unit that detects a position (hereinafter referred to as operational input position) at which the user of the electronic device 100 touches the top panel 120.

Various buttons and the like using the GUI (hereinafter referred to as GUI operation unit) are displayed on the display panel 160 under the touch panel 150. Accordingly, the user of the electronic device 100 normally touches the top panel 120 with his/her fingertip to operate the GUI operation unit.

The touch panel 150 is only required to be a coordinate detection unit capable of detecting the position of the operational input on the top panel 120 by the user, and may be, for example, a capacitive or resistive coordinate detection unit. Here, a mode in which the touch panel 150 is a capacitive coordinate detection unit will be described. The capacitive touch panel 150 can detect operational input to the top panel 120 even if there is a gap between the touch panel 150 and the top panel 120.

In addition, although a mode in which the top panel 120 is disposed on the input surface side of the touch panel 150 will be described here, the top panel 120 may be integrated with the touch panel 150. In that case, the surface of the touch panel 150 serves as the surface of the top panel 120 illustrated in FIGS. 2 and 3, which constitutes an operation surface. Furthermore, the top panel 120 illustrated in FIGS. 2 and 3 may be omitted in the configuration. In that case as well, the surface of the touch panel 150 constitutes an operation surface. In addition, in that case, it is sufficient if the member having the operation surface is vibrated by the natural vibration of the member.

Furthermore, in a case where the touch panel 150 is resistive, the touch panel 150 may be disposed on the top panel 120. In that case as well, the surface of the touch panel 150 constitutes an operation surface. Furthermore, the top panel 120 illustrated in FIGS. 2 and 3 may be omitted in the configuration. In that case as well, the surface of the touch panel 150 constitutes an operation surface. In addition, in that case, it is sufficient if the member having the operation surface is vibrated by the natural vibration of the member.

The display panel 160 only needs to be a display panel capable of displaying an image, such as a liquid crystal display panel and an organic electroluminescence (EL) panel, for example. The display panel 160 is disposed on the substrate 170 (Z-axis positive direction side) using a holder or the like (not illustrated) inside the recess 110A of the housing 110.

The display panel 160 is driven and controlled by a driver integrated circuit (IC) to be described later, and displays the GUI operation unit, an image, a character, a symbol, a figure, and the like depending on the operation status of the electronic device 100.

The substrate 170 is disposed inside the recess 110A of the housing 110. The display panel 160 and the touch panel 150 are disposed on the substrate 170. The display panel 160 and the touch panel 150 are fixed to the substrate 170 and the housing 110 by a holder or the like (not illustrated).

In addition to the drive control device to be described later, various circuits and the like necessary to drive the electronic device 100 are mounted on the substrate 170.

In the electronic device 100 having a configuration as described above, when the user touches the top panel 120 with his/her finger and the movement of the fingertip is detected, the drive control unit mounted on the substrate 170 drives the vibrating elements 140A and 140B and vibrates the top panel 120 at the frequency in the ultrasonic band. The frequency in the ultrasonic band is a resonance frequency of a resonance system including the top panel 120 and the vibrating elements 140A and 140B, which generates a standing wave in the top panel 120.

By generating standing waves in the ultrasonic band, the electronic device 100 provides a tactile property to the user through the top panel 120.

Next, the standing waves to be generated in the top panel 120 will be described with reference to FIGS. 4A and 4B.

Figure 4A:
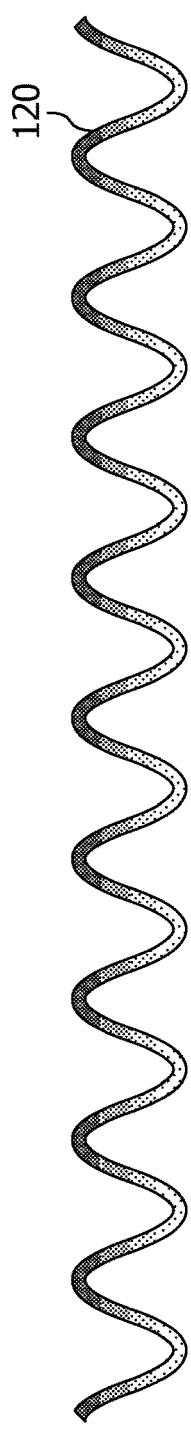
FIGS. 4A and 4B are a view illustrating a wave head formed in parallel to a short side of a top panel among standing waves generated in a top panel by natural vibration in an ultrasonic band.
Figure 4B:
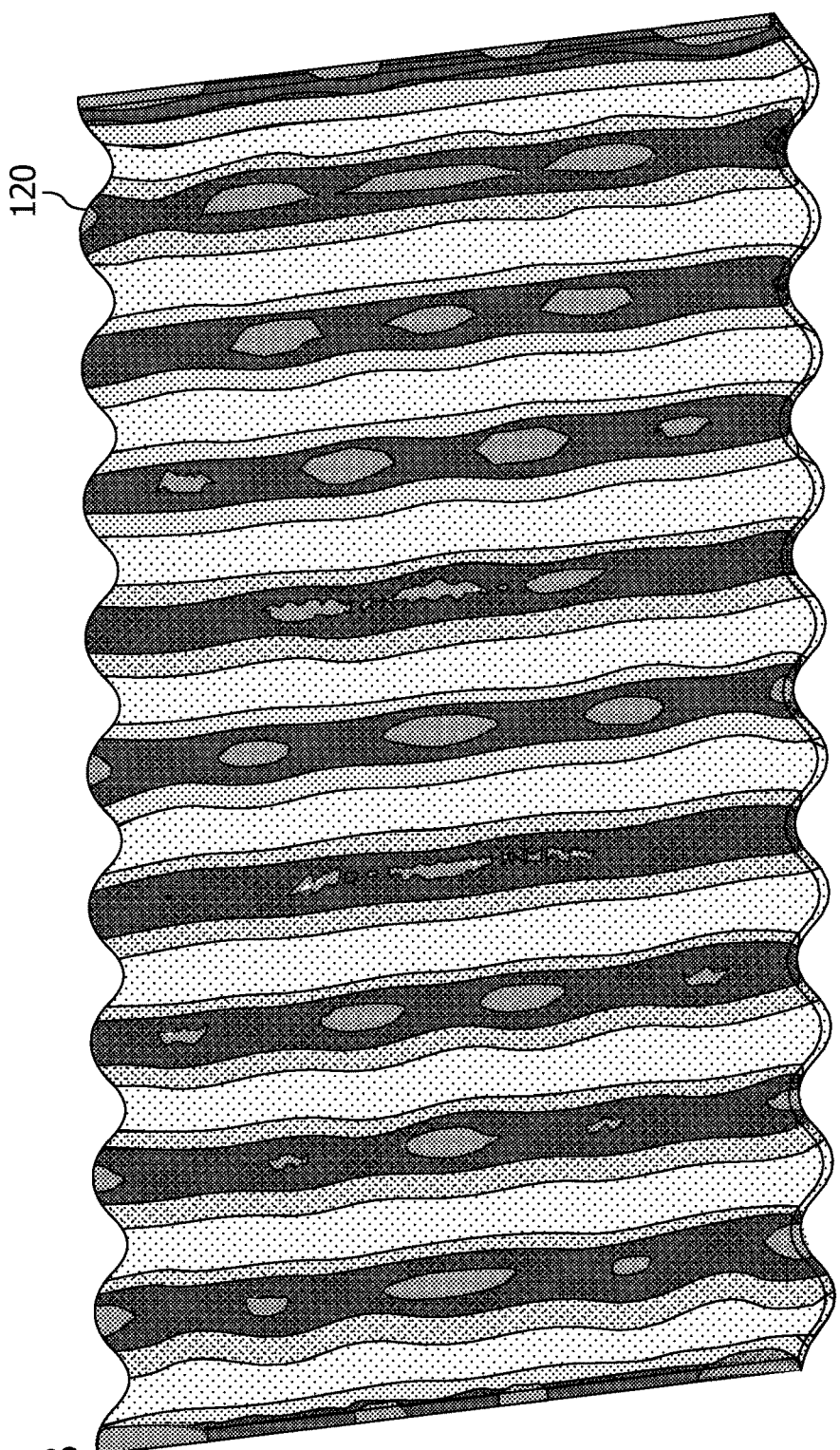

FIGS. 4A and 4B are a view illustrating a wave head formed in parallel to the short side of the top panel 120 among the standing waves generated in the top panel 120 by natural vibration in the ultrasonic band. FIG. 4A is a side view, and FIG. 4B is a perspective view. In FIGS. 4A and 4B, XYZ coordinates similar to those in FIGS. 2 and 3 are defined. Note that FIGS. 4A and 4B illustrate the amplitude of the standing waves in an exaggerated manner for easy understanding. In addition, the vibrating elements 140A and 140B are omitted in FIGS. 4A and 4B.

A natural frequency (resonant frequency) f of the top panel 120 is expressed by the following formulae (1) and (2) using the Young's modulus E, the density $\rho$, the Poisson's ratio $\delta$, a long side dimension l, and a thickness t of the top panel 120, and the number of cycles k of the standing waves existing in a long side direction. Since the standing wave has the same waveform in units of ½ cycle, the number of cycles k is 0.75, 1.25, 1.75, 2.25, . . . , which is a value increased by 0.5 at a time.

[Math. 1]

$$f = \frac{\pi k^2 t}{l^2} \sqrt{\frac{E}{3\rho(1-\delta^2)}} \quad (1)$$

[Math. 2]

$$f = \alpha k^2 \quad (2)$$

Note that a coefficient $\alpha$ in the formula (2) is a collective expression of coefficients other than $k^2$ in the formula (1).

The standing wave illustrated in FIGS. 4A and 4B is an exemplar waveform in a case where the number of cycles k is 9.75. In a case where Gorilla (registered trademark) glass having a long side length L of 140 mm, a short side length of 80 mm, and the thickness t of 0.7 mm is used as the top panel 120, for example, the natural frequency f is 33.5 kHz when the number of cycles k is 9.75. In that case, it is sufficient if the drive signals having a frequency of 33.5 [kHz] are used.

The top panel 120 is a tabular member, and when the vibrating elements 140A and 140B (see FIGS. 2 and 3) are driven to generate the natural vibration in the ultrasonic band, it is bended as illustrated in FIGS. 4A and 4B, thereby generating standing waves of bending vibration.

Note that, in a case of driving the two vibrating elements 140A and 140B, it is sufficient to drive the two vibrating elements in the same phase because the modes are symmetric modes in the case of the number of cycles k=0.75, 1.75, 2.75, or the like, and it is sufficient to drive the two vibrating elements in opposite phases because the modes are antisymmetric modes in the case of the number of cycles kk=1.25, 2.25, 3.25, or the like.

Furthermore, here, a mode in which the electronic device 100 includes the two vibrating elements 140A and 140B is described. However, the electronic device 100 may have a configuration including one of the vibrating elements 140A and 140B.

FIGS. 5A and 5B are a diagram illustrating a state in which dynamic friction force applied to a fingertip performing operational input changes due to the natural vibration in the ultrasonic band generated in the top panel 120 of the electronic device 100. In FIGS. 5A and 5B, the user is performing, while touching the top panel 120 with the fingertip, operational input of moving the finger along the arrow from the back side to the front side of the top panel 120. Note that the vibration is turned on/off by the vibrating elements 140A and 140B (see FIGS. 2 and 3) being turned on/off.

Furthermore, in FIGS. 5A and 5B, the range touched by the finger while the vibration is off is illustrated in gray, and the range touched by the finger while the vibration is on is illustrated in white in the depth direction of the top panel 120.

While the natural vibration in the ultrasonic band is generated in the entire top panel 120 as illustrated in FIGS. 4A and 4B, FIGS. 5A and 5B illustrate operation pattern of switching on/off of the vibration while the user's finger moves from the back side to the front side of the top panel 120.

Accordingly, in FIGS. 5A and 5B, the range touched by the finger while the vibration is off is illustrated in gray, and the range touched by the finger while the vibration is on is illustrated in white in the depth direction of the top panel 120.

In the operation pattern illustrated in FIG. 5A, the vibration is off when the user's finger is on the back side of the top panel 120, and the vibration is turned on while the finger moves to the front side.

On the other hand, in the operation pattern illustrated in FIG. 5B, the vibration is on when the user's finger is on the back side of the top panel 120, and the vibration is turned off while the finger moves to the front side.

Here, when the natural vibration in the ultrasonic band is generated in the top panel 120, an air layer based on the squeeze effect is interposed between the surface of the top panel 120 and the finger, and a dynamic friction coefficient at the time when the surface of the top panel 120 is traced with the finger decreases.

Accordingly, in FIG. 5A, the dynamic friction force applied to the fingertip is large in the range illustrated in gray on the back side of the top panel 120, and the dynamic friction force applied to the fingertip is small in the range illustrated in white on the front side of the top panel 120.

Accordingly, as illustrated in FIG. 5A, the user who performs operational input to the top panel 120 senses a decrease in the dynamic friction force applied to the fingertip when the vibration is turned on, and perceives the ease of slipping of the fingertip. At this time, with the surface of the top panel 120 being smoother, the user feels that a recess exists on the surface of the top panel 120 when the dynamic friction force decreases.

On the other hand, in FIG. 5B, the dynamic friction force applied to the fingertip is small in the range illustrated in white on the back front side of the top panel 120, and the dynamic friction force applied to the fingertip is large in the range illustrated in gray on the front side of the top panel 120.

Accordingly, as illustrated in FIG. 5B, the user who performs operational input to the top panel 120 senses an increase in dynamic friction force applied to the fingertip when the vibration is turned off, and perceives a hard-to-slip sense of the fingertip or the feeling of being caught. Then, since the fingertip becomes less slippery, it feels as if a projection existed on the surface of the top panel 120 when the dynamic friction force increases.

As described above, the user can feel the unevenness with the fingertip in the case of FIGS. 5A and 5B. The fact that a person perceives the unevenness in this manner is disclosed in, for example, "Print Transfer Method for Tactile Design and Sticky-band Illusion" (Papers of 11th Annual Conference of the Society of Instrument and Control Engineers (SICE) System Integration Division (SI2010, Sendai), 174-177, 2010-12). It is also disclosed in "Fishbone Tactile Illusion" (Papers of 10th Annual Conference of the Virtual Reality Society of Japan (VRSJ) (September 2005)).

Note that, although the change in dynamic friction force in the case where on/off of the vibration is switched has been described here, the same applies to the case where the amplitude (intensity) of the vibrating elements 140A and 140B is changed.

Next, a configuration of the electronic device 100 according to the embodiment will be described with reference to FIG. 6.

Figure 6:
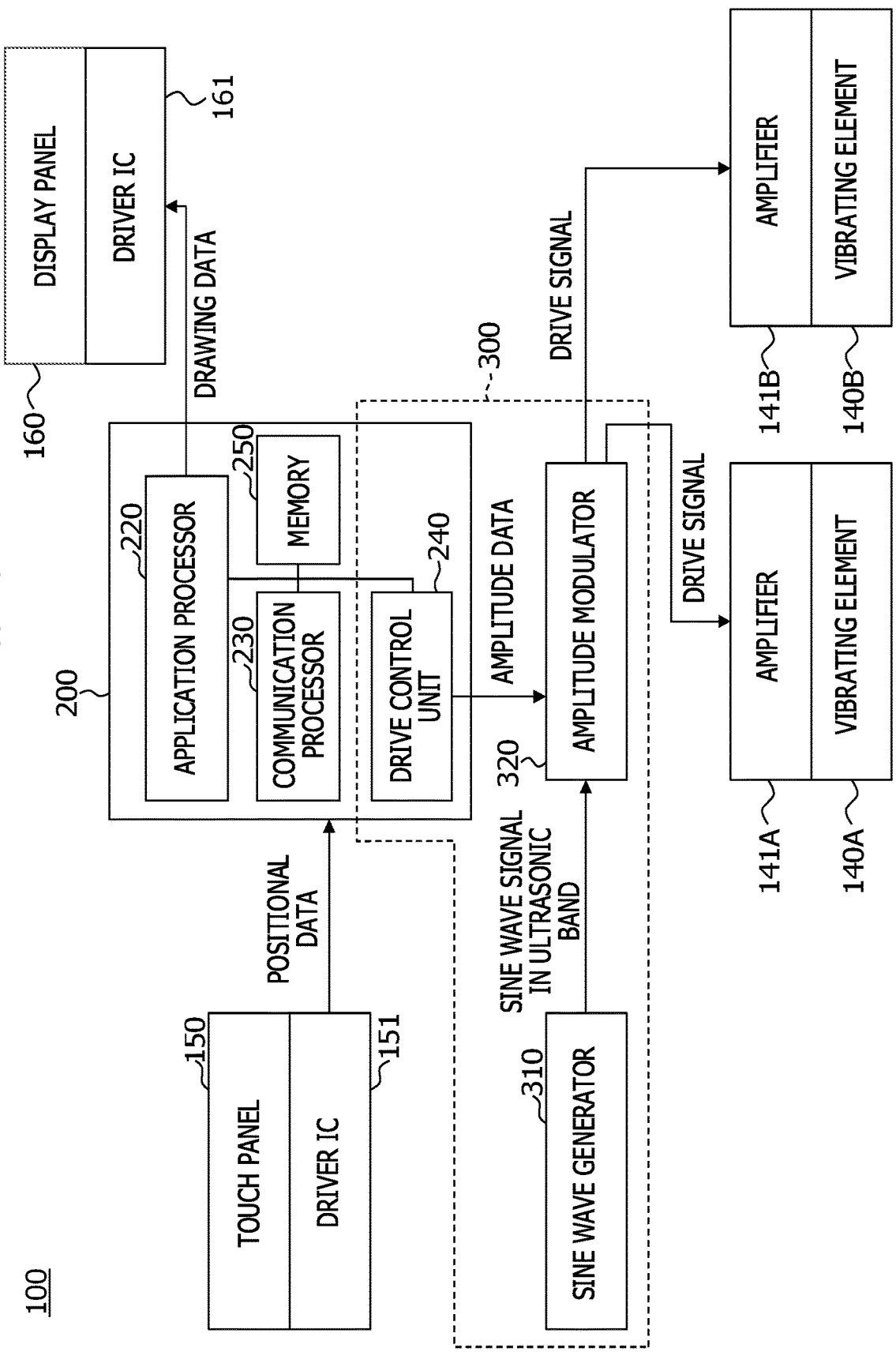
FIG. 6 is a diagram illustrating a configuration of the electronic device according to the embodiment.

FIG. 6 is a diagram illustrating a configuration of the electronic device 100 according to an embodiment.

The electronic device 100 includes the vibrating elements 140A and 140B, amplifiers 141A and 141B, the touch panel 150, a driver integrated circuit (IC) 151, the display panel 160, a driver IC 161, a control unit 200, a sine wave generator 310, and an amplitude modulator 320.

The control unit 200 includes an application processor 220, a communication processor 230, a drive control unit 240, and a memory 250. The control unit 200 is implemented by, for example, an IC chip.

Furthermore, the drive control unit 240, the sine wave generator 310, and the amplitude modulator 320 constitute a drive control device 300. Note that, although a mode in which the application processor 220, the communication processor 230, the drive control unit 240, and the memory 250 are implemented by one control unit 200 will be described here, the drive control unit 240 may be separately provided outside the control unit 200 as another IC chip or a processor. In that case, it is sufficient if, among data stored in the memory 250, data necessary for the drive control of the drive control unit 240 is stored in a memory different from the memory 250 and provided inside the drive control device 300.

In FIG. 6, the housing 110, the top panel 120, the double-sided tape 130, and the substrate 170 (see FIG. 2) are omitted. Furthermore, here, the amplifiers 141A and 141B, the driver IC 151, the driver IC 161, the drive control unit 240, the memory 250, the sine wave generator 310, and the amplitude modulator 320 will be described.

The amplifiers 141A and 141B are disposed between the drive control device 300 and the vibrating elements 140A and 140B, and amplify the drive signals output from the drive control device 300 to drive the vibrating elements 140A and 140B, respectively.

The driver IC 151 is connected to the touch panel 150, detects positional data indicating a position at which operational input to the touch panel 150 has been made, and outputs the positional data to the control unit 200. As a result, the positional data is input to the application processor 220 and the drive control unit 240. Note that inputting positional data to the drive control unit 240 is equivalent to inputting positional data to the drive control device 300.

The driver IC 161 is connected to the display panel 160, inputs drawing data output from the drive control device 300 to the display panel 160, and causes the display panel 160 to display an image based on the drawing data. Accordingly, the GUI operation unit, an image based on the drawing data, or the like is displayed on the display panel 160.

The application processor 220 performs a process of executing various applications of the electronic device 100.

The communication processor 230 executes a process necessary for the electronic device 100 to perform communication, such as 3rd generation (3G), 4th generation (4G), long term evolution (LTE), and Wi-Fi.

In a case where two predetermined conditions are satisfied, the drive control unit 240 outputs amplitude data to the amplitude modulator 320. The amplitude data is data indicating an amplitude value for adjusting the intensity of the drive signals used to drive the vibrating elements 140A and 140B. The amplitude value is set according to a degree of temporal change in the positional data. Here, as the degree of temporal change in the positional data, a speed at which the user's fingertip moves along the surface of the top panel 120 is used. The moving speed of the user's fingertip is calculated by the drive control unit 240 on the basis of the degree of temporal changes in the positional data input from the driver IC 151.

Furthermore, the drive control device 300 according to the embodiment vibrates the top panel 120 to change the dynamic friction force applied to the user's fingertip when the fingertip moves along the surface of the top panel 120. Since the dynamic friction force is generated during the movement of the fingertip, the drive control unit 240 vibrates the vibrating elements 140A and 140B when the moving speed becomes equal to or higher than a predetermined threshold speed. It is the first predetermined condition that the moving speed becomes equal to or higher than the predetermined threshold speed.

Therefore, the amplitude value indicated by the amplitude data output from the drive control unit 240 is zero when the moving speed is less than the predetermined threshold speed, and when the moving speed becomes equal to or higher than the predetermined threshold speed, predetermined amplitude value is set according to the moving speed. When the moving speed is equal to or higher than the predetermined threshold speed, the amplitude value is set to be smaller as the moving speed is higher, and the amplitude value is set to be larger as the moving speed is lower.

Furthermore, in a case where the position of the fingertip that performs operational input is within a predetermined area where vibration is to be generated, the drive control device 300 according to the embodiment outputs the amplitude data to the amplitude modulator 320. It is the second predetermined condition that the position of the fingertip that performs operational input is within the predetermined area where the vibration is to be generated.

It is determined whether the position of the fingertip that performs operational input is within the predetermined area where the vibration is to be generated on the basis of whether or not the position of the fingertip that performs operational input is inside the predetermined area where the vibration is to be generated.

Here, the position on the display panel 160, such as the GUI operation unit to be displayed on the display panel 160, an area for displaying an image, and an area representing the entire page, is specified by area data indicating the area. The area data exists for all GUI operation units displayed on the display panel 160, areas for displaying an image, or areas representing the entire page in all applications.

Therefore, when it is determined whether the position of the fingertip that performs operational input is within the predetermined area where the vibration is to be generated as the second predetermined condition, a type of the application being activated by the electronic device 100 has relations. This is because the display on the display panel 160 differs and the type of the operational input differs depending on the type of the application.

The drive control unit 240 determines, using the area data, whether or not the position indicated by the positional data input from the driver IC 151 is inside the predetermined area where the vibration is to be generated.

Data in which data indicating a type of the application, area data indicating the GUI operation unit or the like on which operational input is made, and pattern data indicating a vibration pattern are associated with each other is stored in the memory 250.

The memory 250 stores the data in which data indicating a type of the application, area data indicating the GUI operation unit or the like on which operational input is made, and pattern data indicating a vibration pattern are associated with each other.

Furthermore, the memory 250 stores data and programs necessary for the application processor 220 to execute an application, data and programs necessary for the communication processor 230 to perform communication processing, and the like.

The sine wave generator 310 generates a sine wave necessary for generating the drive signal for vibrating the top panel 120 at the natural frequency. For example, in a case where the top panel 120 is caused to vibrate at the natural frequency f of 33.5 [kHz], the frequency of the sine wave is 33.5 [kHz]. The sine wave generator 310 inputs sine wave signals in the ultrasonic band to the amplitude modulator 320.

The sine wave signals generated by the sine wave generator 310 are alternating reference signals to be a basis of the drive signals for generating the natural vibration in the ultrasonic band, and has a constant frequency and a constant phase. The sine wave generator 310 inputs sine wave signals in the ultrasonic band to the amplitude modulator 320.

Note that, although a mode in which the sine wave generator 310 that generates sine wave signals is used will be described here, the signals may not be the sine wave signals. For example, a signal having a waveform in which the rising and falling waveforms of the clock are blunted may be used. Therefore, a signal generator that generates alternating-current signals in the ultrasonic band may be used instead of the sine wave generator 310.

The amplitude modulator 320 modulates the amplitude of the sine wave signal input from the sine wave generator 310 using the amplitude data input from the drive control unit 240, and generates the drive signal. The amplitude modulator 320 modulates only the amplitude of the sine wave signal in the ultrasonic band input from the sine wave generator 310, and generates the drive signal without modulating the frequency and the phase.

Hence, the drive signal output from the amplitude modulator 320 is a sine wave signal in the ultrasonic band obtained by modulating only the amplitude of the sine wave signal in the ultrasonic band input from the sine wave generator 310. Note that the amplitude of the drive signal is zero in the case where the amplitude data is zero. This is equivalent to a state in which the amplitude modulator 320 does not output drive signals.

Next, data to be stored in the memory 250 will be described with reference to FIG. 7.

FIG. 7 is a table illustrating data to be stored in the memory 250.

As illustrated in FIG. 7, data in which data indicating a type of the application, area data indicating a coordinate value of the area where the GUI operation unit or the like on which operational input is made is displayed, and pattern data indicating a vibration pattern are associated with each other is stored in the memory 250.

Application identification (ID) is illustrated as the data indicating a type of the application. In addition, formulae f1 to f4 representing a coordinate value of the area where the GUI operation unit or the like on which operational input is made is displayed are illustrated as the area data. In addition, P1 to P4 are illustrated as the pattern data indicating a vibration pattern. The pattern data P1 to P4 are data in which amplitude data indicating amplitude values are arranged in time series.

Note that the application indicated by the application ID includes all applications that can be used on a smartphone terminal or a tablet computer, and also includes an email editing mode.

Next, processing executed by the drive control unit 240 of the drive control device 300 of the electronic device 100 according to the embodiment will be described with reference to FIG. 8.

Figure 8:
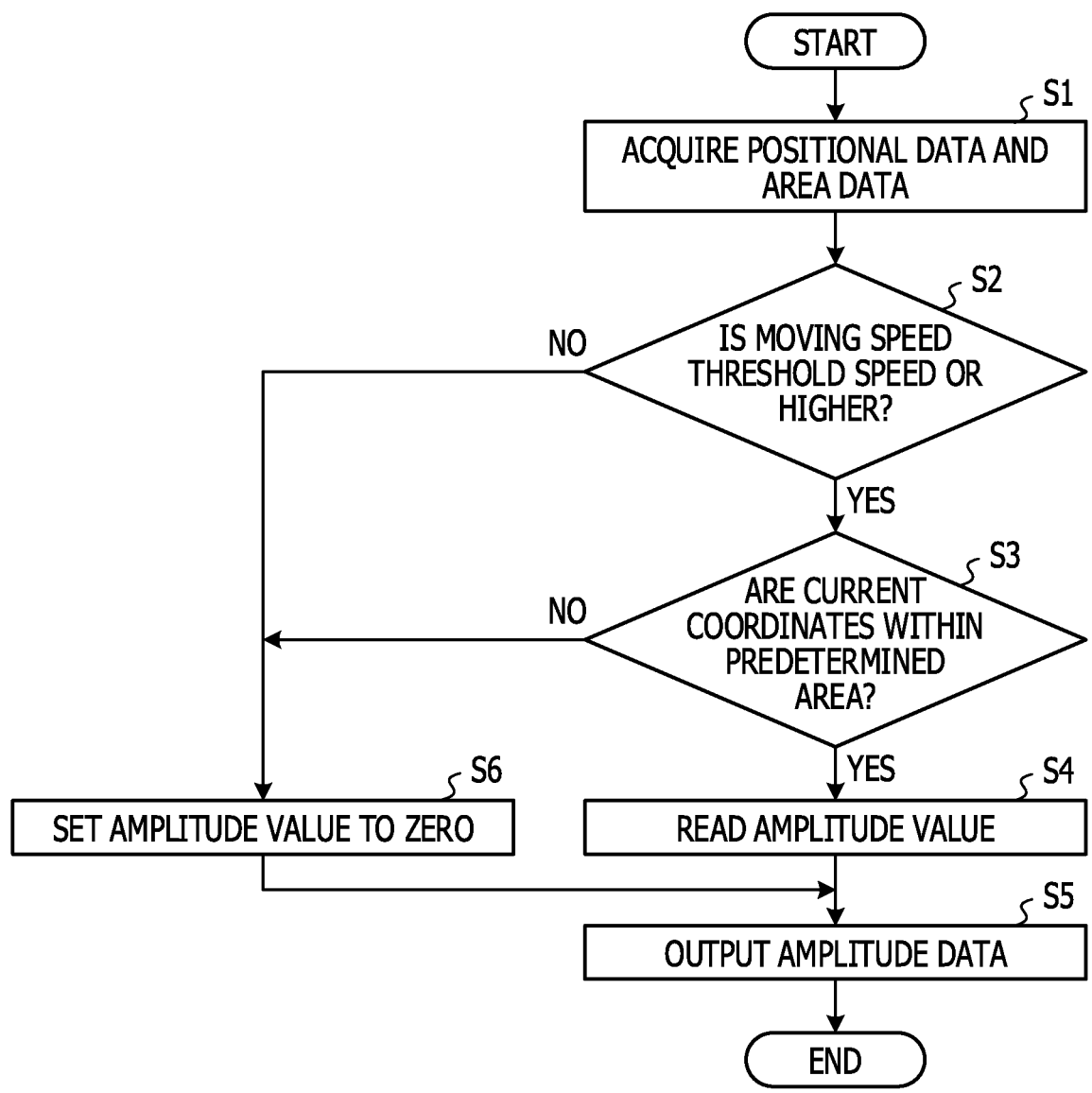
FIG. 8 is a flowchart illustrating processing executed by a drive control unit of a drive control device of the electronic device according to the embodiment.

FIG. 8 is a flowchart illustrating processing executed by the drive control unit 240 of the drive control device 300 of the electronic device 100 according to the embodiment.

An operating system (OS) of the electronic device 100 executes control for driving the electronic device 100 for each predetermined control cycle. Accordingly, the drive control device 300 performs computing for each predetermined control cycle. The same applies to the drive control unit 240, and the drive control unit 240 repeatedly executes the flow illustrated in FIG. 8 for each predetermined control cycle.

Here, a required time Δt is approximately equal to the control cycle where the required time from when the positional data is input from the driver IC 151 to the drive control device 300 to when the drive control unit 240 calculates the drive signal on the basis of the positional data is Δt.

One cycle time of the control cycle can be treated to correspond to the required time Δt from when the positional data is input from the driver IC 151 to the drive control device 300 to when the drive signal is calculated on the basis of the positional data.

The drive control unit 240 starts the process when the power of the electronic device 100 is turned on.

The drive control unit 240 obtains area data associated with the vibration pattern for the GUI operation unit on which the current operational input is being made according to the coordinates indicated by the current positional data and the type of the current application (step S1).

The drive control unit 240 determines whether or not the moving speed is equal to or higher than a predetermined threshold speed (step S2). It is sufficient if the moving speed is calculated by vector operation. Note that it is sufficient if the threshold speed is set as the minimum speed of the moving speed of the fingertip at the time when the operational input is made while moving the fingertip, such as what is called flick operation, swipe operation, and drag operation. Such a minimum speed may be set on the basis of experimental results, or may be set according to resolution of the touch panel 150 or the like.

In a case where the moving speed is determined to be equal to or higher than the predetermined threshold speed in step S2, the drive control unit 240 determines whether or not the coordinates indicated by the current positional data are within an area St indicated by the area data obtained in step S1 (step S3).

In a case where the coordinates indicated by the current positional data are determined to be within the area St indicated by the area data obtained in step S1, the drive control unit 240 reads, from the pattern data, the amplitude data indicating the amplitude value corresponding to the moving speed obtained in step S2 (step S4).

The drive control unit 240 outputs the amplitude data (step S5). Then, the amplitude modulator 320 modulates the amplitude of the sine wave output from the sine wave generator 310 to generate the drive signal, and the vibrating elements 140A and 140B are driven.

On the other hand, in a case where the moving speed is determined not to be equal to or higher than the predetermined threshold speed in step S2 (S2: NO), and in a case where the coordinates indicated by the current positional data are determined not to be within the area St indicated by the area data obtained in step S1 in step S3, the drive control unit 240 sets the amplitude value to zero (step S6).

As a result, the drive control unit 240 outputs the amplitude data having the amplitude value of zero, and the amplitude modulator 320 generates drive signals in which the amplitude of the sine wave output from the sine wave generator 310 is modulated to zero. Accordingly, the vibrating elements 140A and 140B are not driven in this case.

Next, the vibration mode of the natural vibration generated in the top panel 120 will be described.

A shape w(Y) of the vibration mode of only the top panel 120 is expressed by a sum of a hyperbolic function and a trigonometric function as expressed in Expression (3), where the top panel 120 is assumed as a one-dimensional beam. Note that Y represents a position in the Y-axis direction with an origin (Y=0) at an end of the top panel 120 on the Y-axis negative direction side. Further, $C_1$ to $C_4$ represent constant values, k represents the number of cycles of the vibration mode, and l represents the length of the top panel 120 in the Y-axis direction.

[Math. 3]

$$w(Y) = C_1 \cosh\frac{2\pi kY}{l} + C_2 \sinh\frac{2\pi kY}{l} + C_3 \cos\frac{2\pi kY}{l} + C_4 \sin\frac{2\pi kY}{l} \quad (3)$$

Furthermore, a natural frequency f of the vibration mode expressed by Expression (3) can be calculated by Expression (4). Note that E represents the Young's modulus of the top panel 120, and ρ represents the density of the top panel 120.

[Math. 4]

$$f = \frac{\pi k^2 t}{l^2}\sqrt{\frac{E}{3\rho}} \quad (4)$$

Figure 9:
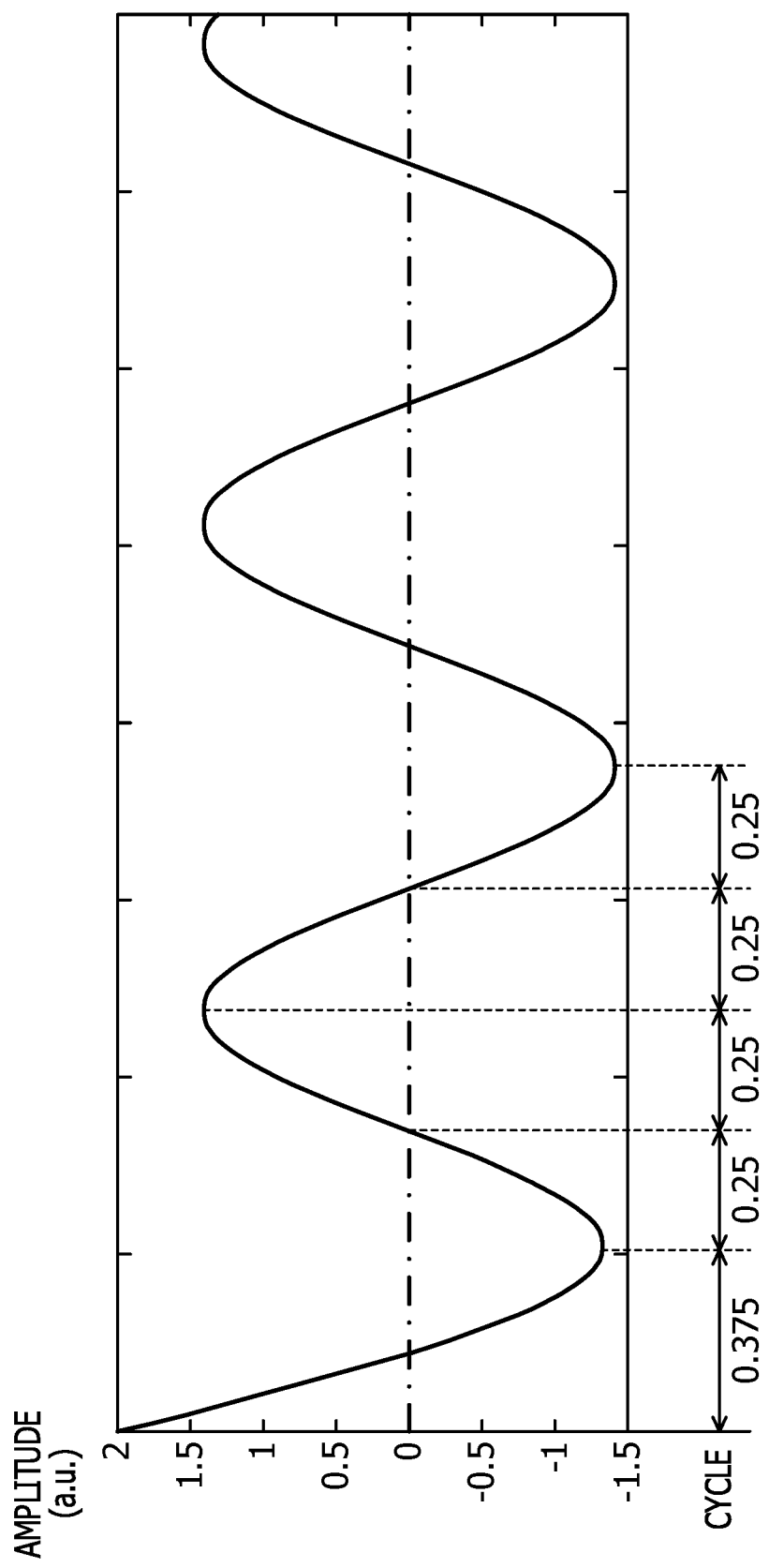
FIG. 9 is a diagram illustrating positions of nodes and antinodes in a vibration mode by the number of cycles.

Here, by determining C1 to C4 and k in Expression (3) by a boundary condition, the shape of the vibration mode can be obtained with high accuracy. However, in a case of rough approximation, the value of k under a free end condition is "an apparent number of cycles −0.25". Therefore, the positions of nodes and antinodes in the vibration mode are as illustrated in FIG. 9 with reference to a tip end and can be roughly estimated by Expression (5). FIG. 9 is a diagram illustrating the positions of nodes and antinodes in the vibration mode by the number of cycles. Note that, in a case of driving the vibrating elements 140A and 140B in the same phase, k=0.75, 1.75, 2.75, . . . . In a case of driving the vibrating elements 140A and 140B in opposite phases, k=1.25, 2.25, 3.25, . . . .

[Math. 5]

$$\text{Position of node: } \frac{l}{k}\left(\frac{n}{2} + 0.125\right) \quad (5)$$

$$\text{Position of antinode: } \frac{l}{k}\left(\frac{n}{2} - 0.125\right)$$

$$(n = 1, 2, 3, \ldots)$$

For example, the position of the antinode is 3.8 [mm] where l=140 [mm], k=13.75, and n=1. n is a value (1, 2, 3, . . . ) indicating the n-th antinode and node from the end of the top panel 120 on the Y-axis negative direction side.

Figure 10:
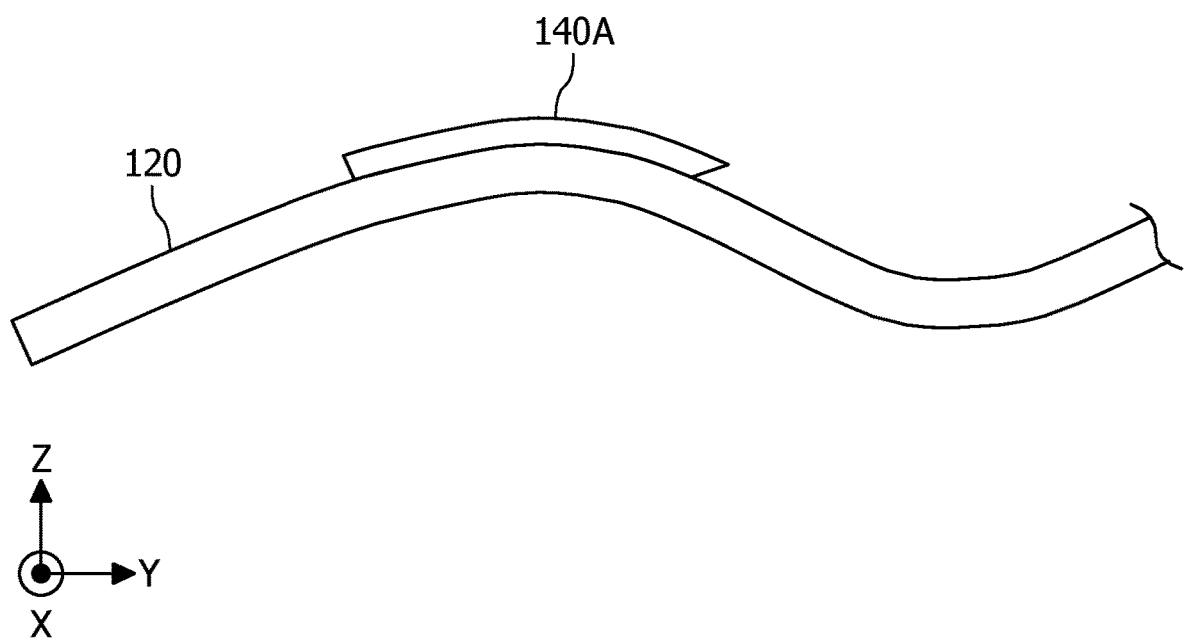
FIG. 10 is a view illustrating vibration of the top panel.

FIG. 10 is a view illustrating vibration of the top panel 120. FIG. 10 illustrates an end portion on the Y-axis negative direction side to which the vibrating element 140A is mounted, on the top panel 120. The maximum amplitude of the top panel 120 is obtained in a case where an attachment position of the vibrating element 140A or 140B is set to the position of an antinode in the vibration mode. Since the shape of the vibration mode changes in a section where the vibrating element 140A or 140B is attached (a section of a width in the Y-axis direction of the vibrating element 140A or 140B), as illustrated in FIG. 10, the actual position of an antinode deviates from the approximate value by Expression (5).

The actual position of an antinode deviating from the approximate value by Expression (5) is because a wavelength A of the natural vibration in the section where the vibrating element 140A is attached is affected by a sound velocity change rate c, and the waveform itself is also affected as variation a, as illustrated in FIG. 10. This similarly applies to the vibrating element 140B.

The sound velocity change rate c and the waveform variation a can be defined as illustrated in Expression (6), using a change rate Gr of the bending rigidity and a change rate Mr of the mass in the section where the vibrating element 140A of the top panel 120 is attached due to the vibrating elements 140A and 140B being attached to the top panel 120.

[Math. 6]

$$c = \sqrt[4]{Gr/Mr} \quad (6)$$

$$a = 0.75 - 0.25/Gr$$

Here, the sound velocity change rate c is a rate at which the velocity of the wave of the natural vibration propagating through the top panel 120 changes due to attaching of the vibrating elements 140A and 140B, and is expressed as a ratio of the velocity of the wave of the natural vibration in the case of attaching the vibrating elements 140A and 140B to a velocity of the wave of the natural vibration in a case of not attaching the vibrating elements 140A and 140B.

Furthermore, the waveform variation a is expressed as a value obtained by converting the waveform in the case of attaching the vibrating elements 140A and 140B to the top panel 120 into the number of cycles, as compared with the waveform in the case of not attaching the vibrating elements 140A and 140B to the top panel 120.

Since the rigidity of the top panel 120 is higher in the case of attaching the vibrating elements 140A and 140B to the top panel 120 than in the case of not attaching the vibrating elements 140A and 140B to the top panel 120, the waveform variation a is discussed as follows.

In the case where the vibrating elements 140A and 140B are attached to the top panel 120, the maximum value of the waveform variation a in the section where the vibrating element 140A is attached in the vibration mode is 0.75. This corresponds to an approximate value k of the number of cycles of a basic vibration mode (minimum vibration mode) of when both ends of the top panel 120 in the Y-axis direction are free ends.

Furthermore, in the case where the vibrating elements 140A and 140B are attached to the top panel 120, the minimum value of the waveform variation a in the section where the vibrating element 140A is attached in the vibration mode is 0.5. This is equivalent to when the vibrating elements 140A and 140B are not attached to the top panel 120, that is, corresponds to the number of cycles in the basic vibration mode (minimum vibration mode) of when the both ends of the top panel 120 in the Y-axis direction are support ends.

Furthermore, the change rate Gr of the bending rigidity in the section where the vibrating element 140A of the top panel 120 is attached is 1 in a case where the rigidity of the vibrating element 140A is sufficiently smaller than the rigidity of the top panel 120, and is co (infinity) in a case where the rigidity of the vibrating element 140A is sufficiently larger than the rigidity of the top panel 120.

The waveform variation a expressed by Expression (6) becomes the maximum value of 0.75 in the case where the change rate Gr of the rigidity approaches co because the both ends of the section where the vibrating element 140A is attached become close to the free end condition, and becomes 0.5 in the case where the change rate Gr of the rigidity approaches 1 because the both ends of the section where the vibrating element 140A is attached do not change while keeping a support end condition. Furthermore, to realize the maximum value of 0.75 in the case of the free end condition (in the case where Gr approaches co), and 0.5 in the case of the support end condition (in the case where Gr approaches 1), the expression is an expression of dividing a coefficient 0.25 by the change rate Gr of the bending rigidity of the top panel 120.

Furthermore, since the rigidity of the top panel 120 becomes high when the vibrating elements 140A and 140B are attached to the top panel 120, the waveform of the section where the vibrating element 140A of the top panel 120 is attached changes in a direction from the support end to the free end. When the rigidity of the vibrating element 140A becomes high, the value of the change rate Gr of the bending rigidity in the section where the vibrating element 140A of the top panel 120 is attached becomes large.

Therefore, the waveform variation a in Expression (6) is expressed such that the coefficient 0.25 is distributed by the change rate Gr of the bending rigidity in the section where the vibrating element 140A of the top panel 120 is attached.

Furthermore, in the vibration mode of the case of not attaching the vibrating elements 140A and 140B to the top panel 120, the vibration becomes maximum when the vibrating elements 140A and 140B having the width of 0.5λ in the Y-axis direction are attached to the positions of antinodes of the natural vibration. Note that, at this time, the center of the width (0.5A) of the vibrating elements 140A and 140B is located at the positions of antinodes.

Here, in the vibration mode in the case of attaching the vibrating elements 140A and 140B to the top panel 120, the maximum vibration can be obtained even if the vibrating elements 140A and 140B having a wider (longer) width in the Y-axis direction than $0.5\lambda$ is attached, due to change in the vibration mode due to change in the rigidity of the top panel 120. The maximum width of the vibrating elements 140A and 140B in the Y-axis direction in such a case is approximated by $ac\lambda$.

Therefore, when using the sound velocity change rate c and the waveform variation a expressed in Expression (6), an amount of increase of a half wavelength of the natural vibration due to attaching the vibrating elements 140A and 140B to the top panel 120 becomes $ac\lambda - 0.5\lambda$, and a change amount of the antinode position is $(ac\lambda - 0.5\lambda)/2$ when the antinode is located in the center of the half wavelength with the amount of increase.

In a case where the width w in the Y-axis direction of the vibrating element 140A or 140B is narrower (shorter) than $ac\lambda$, the degree of change provided to the vibration mode of the top panel 120 decreases. Therefore, when the degree of change is distributed by a simple proportional distribution of $w/ac\lambda$, the change amount $\delta$ of the antinode position is finally obtained by Expression (7).

[Math. 7]

$$\delta = (ac\lambda - 0.5\lambda)\frac{1}{2} \cdot \frac{w}{ac\lambda} = \left(1 - \frac{0.5}{ac}\right)\frac{w}{2} \quad (7)$$

Figure 11:
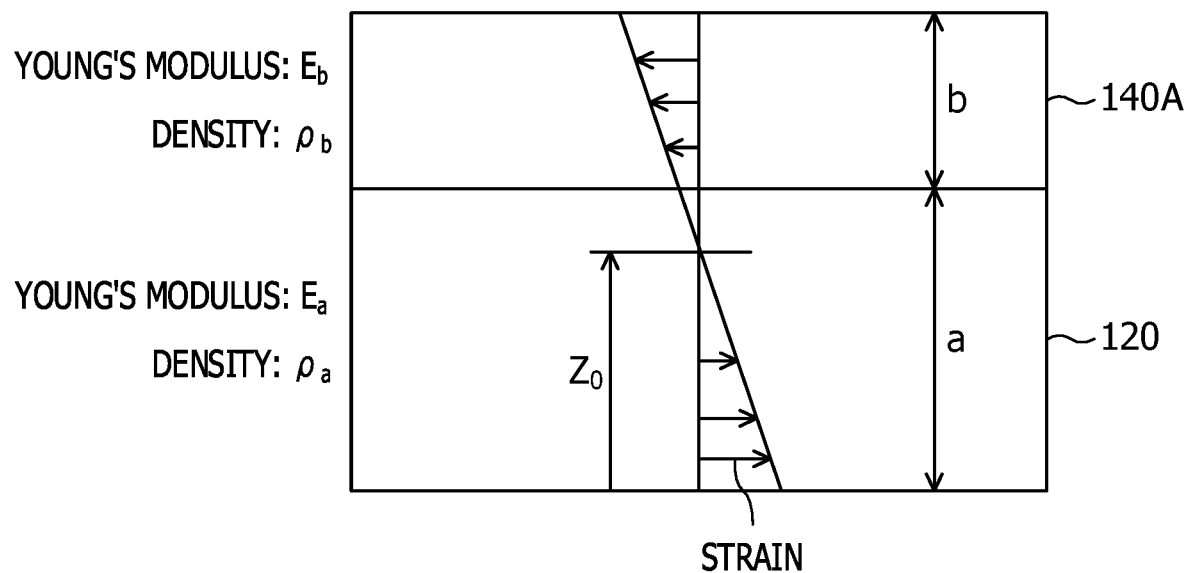
FIG. 11 is a graph illustrating a section where a vibrating element is mounted to the top panel in an overlapping manner.

FIG. 11 is a graph illustrating the section where the vibrating element 140A is mounted to the top panel 120 in an overlapping manner. Here, the section where the vibrating element 140A is attached to the top panel 120 is regarded as a two-layer plywood as illustrated in FIG. 11. The thickness of the first layer (top panel 120) is a, the Young's modulus is Ea, the thickness of the second layer (vibrating element 140) is b, and the Young's modulus is Eb. The origin of Z is a position of a lower surface of the first layer (top panel 120) as illustrated in FIG. 11. Furthermore, a neutral point on the assumption of the Bernoulli-Euler beam is $Z_0$. The change rate Gr of the bending rigidity and the change rate Mr of the mass of the top panel 120 are expressed by Expression (8).

[Math. 8]

$$Z_0 = \frac{E_a a^2 + E_b((a+b)^2 - a^2)}{2(E_a a + E_b b)} \quad (8)$$

$$Gr = 1 + \frac{E_a a(Z_0 - a/2)^2 + E_b b(b^2/12 + (a+b/2 - Z_0)^2)}{E_a a^3/12}$$

$$Mr = 1 + \frac{\rho_b b}{\rho_a a}$$

For example, in a case where the top panel 120 has the Young's modulus of 71 GPa, the thickness in the Z-axis direction of 0.3 mm, and the density of 2450 kg/m$^3$, and the vibrating elements 140A and 140B have the Young's modulus of 70.4 GPa, the thickness in the Z-axis direction of 0.3 mm, the density of 7800 kg/m$^3$, and the width in the Y-axis direction is 8 mm, $\delta$ becomes nearly 1.6 mm, and the position of the first antinode (n=1) from the Y-axis negative direction side of the top panel 120 can be roughly calculated to the position of Y=5.4 mm.

By attaching the vibrating elements 140A and 140B at the positions of antinodes determined by the above rough calculation, the vibration of the top panel 120 can be made large. Furthermore, the vibration of the top panel 120 can be similarly made large by attaching the vibrating elements 140A and 140B to the positions of antinodes determined by a finite element analysis or an actual measurement, in addition to the above-described rough calculation.

However, it is necessary to efficiently increase the vibration of the top panel 120. That is, the efficiency is obtained in the sense that larger vibration of the top panel 120 is obtained in a case where the same voltage is applied to the vibrating elements 140A and 140B.

Furthermore, consider the vibration efficiency in the viewpoint of obtaining larger vibration of the top panel 120 in a case where the vibrating elements 140A and 140B consume the same power. Since mechanical energy of a vibrating object is proportional to the square of amplitude and active power of an AC signal is proportional to conductance, "the square of the amplitude of the top panel 120/the conductance" is used as an index of the vibration efficiency.

Figure 12:
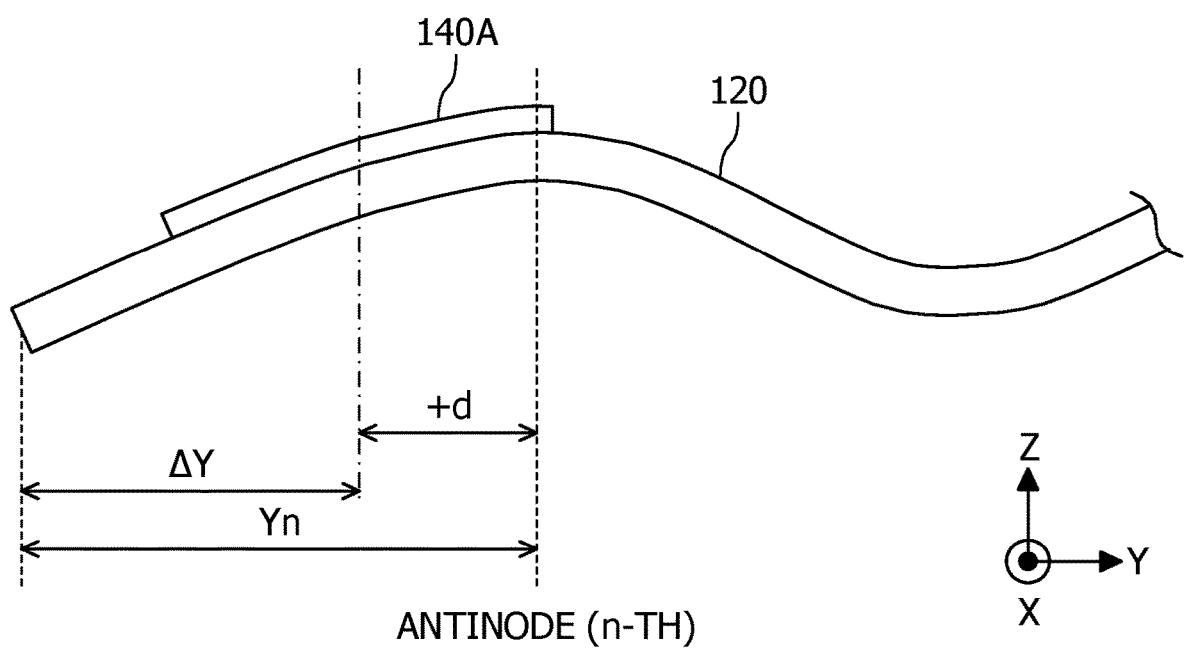
FIG. 12 is a view illustrating natural vibration in an end portion on a Y-axis negative direction side of the top panel.
Figure 13:
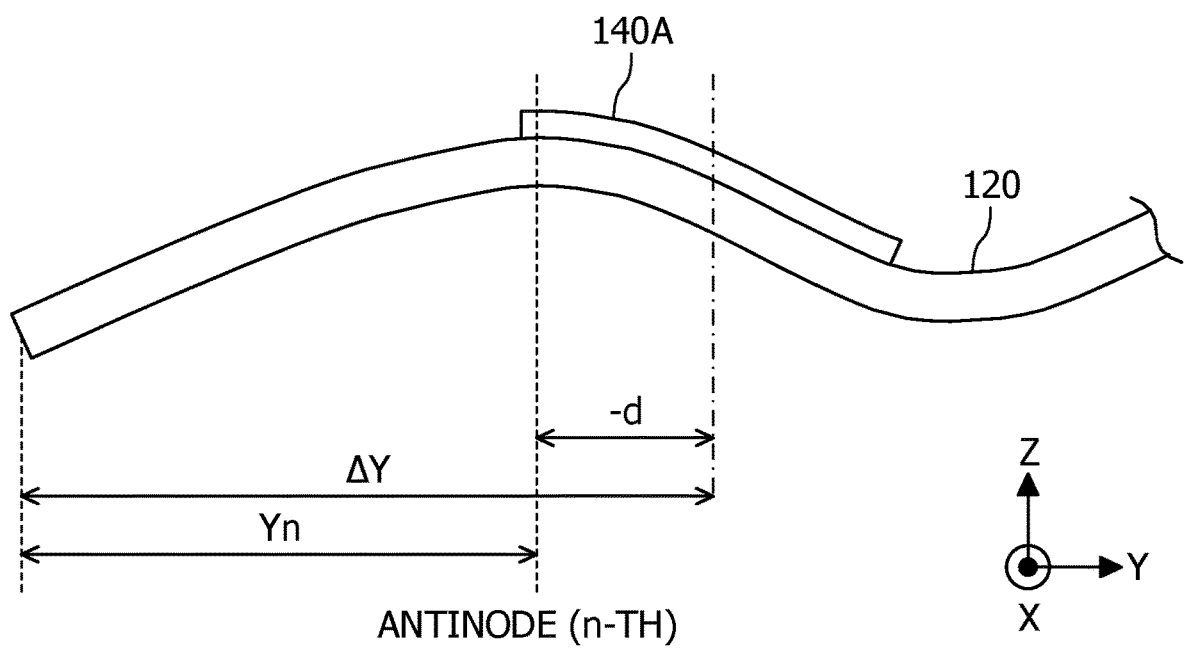
FIG. 13 is a view illustrating natural vibration in an end portion on the Y-axis negative direction side of the top panel.

FIGS. 12 and 13 are diagrams illustrating the natural vibration in an end portion on the Y-axis negative direction side to which the vibrating element 140A is mounted, of the top panel 120. As illustrated in FIG. 12, the distance from the end on the Y-axis negative direction side of the top panel 120 to the position of the n-th antinode is Yn, the attaching position of the vibrating element 140A is $\Delta Y$, and a shift amount from the position of the n-th antinode to the attaching position of the vibrating element 140A is d.

Here, the attaching position $\Delta Y$ represents the length from the end on the Y-axis negative direction side of the top panel 120 to the center of the width in the Y-axis direction of the vibrating element 140A. Furthermore, the shift amount d of the attaching position $\Delta Y$ of the vibrating element 140A takes a positive value (+d) in a case where the vibrating element 140A is shifted to the Y-axis negative direction side with respect to the position of the n-th antinode, and takes a negative value (−d) in a case where the attaching position $\Delta Y$ of the vibrating element 140A is shifted to the Y-axis positive direction side with respect to the position of the n-th antinode, as illustrated in FIG. 13.

Furthermore, here, the vibrating element 140A disposed on the Y-axis negative direction side of the top panel 120 will be described. Since the vibrating element 140A is desirably disposed at a position not overlapping with the display panel 160 in plan view, the value of n is practically about 1 to 3.

Since the vibrating element 140A is disposed on the Y-axis negative direction side of the center of the top panel 120 in the Y-axis direction, the shift amount (+d) in the case where the vibrating element 140A is shifted in the Y-axis negative direction side with respect to the position of the n-th antinode represents that the vibrating element 140A is shifted to an outer side of the top panel 120 with respect to the position of the n-th antinode. Conversely, the shift amount (−d) in the case where the vibrating element 140A is shifted to the Y-axis positive direction side with respect to the position of the n-th antinode represents that the vibrating element 140A is shifted to the center side (inner side) of the top panel 120 with respect to the position of the n-th antinode.

Furthermore, here, generalization is given using the n-th antinode, but FIGS. 12 and 13 illustrate a case where n=1 and the first antinode.

FIG. 14 is a plan view illustrating an end portion on the Y-axis negative direction side of the top panel 120 prototyped with n=1. As illustrated in FIG. 14, the top panel 120 has the length in the Y-axis direction of 140 mm, the width in the X-axis direction of 80 mm, and the thickness in the Z-axis direction of 0.3 mm. Furthermore, the width of the vibrating element 140A in the Y-axis direction is 8 mm. The vibrating element 140A is a vibrating element having an elongated rectangular shape in plan view having the longitudinal direction in the X-axis direction.

Figure 15:
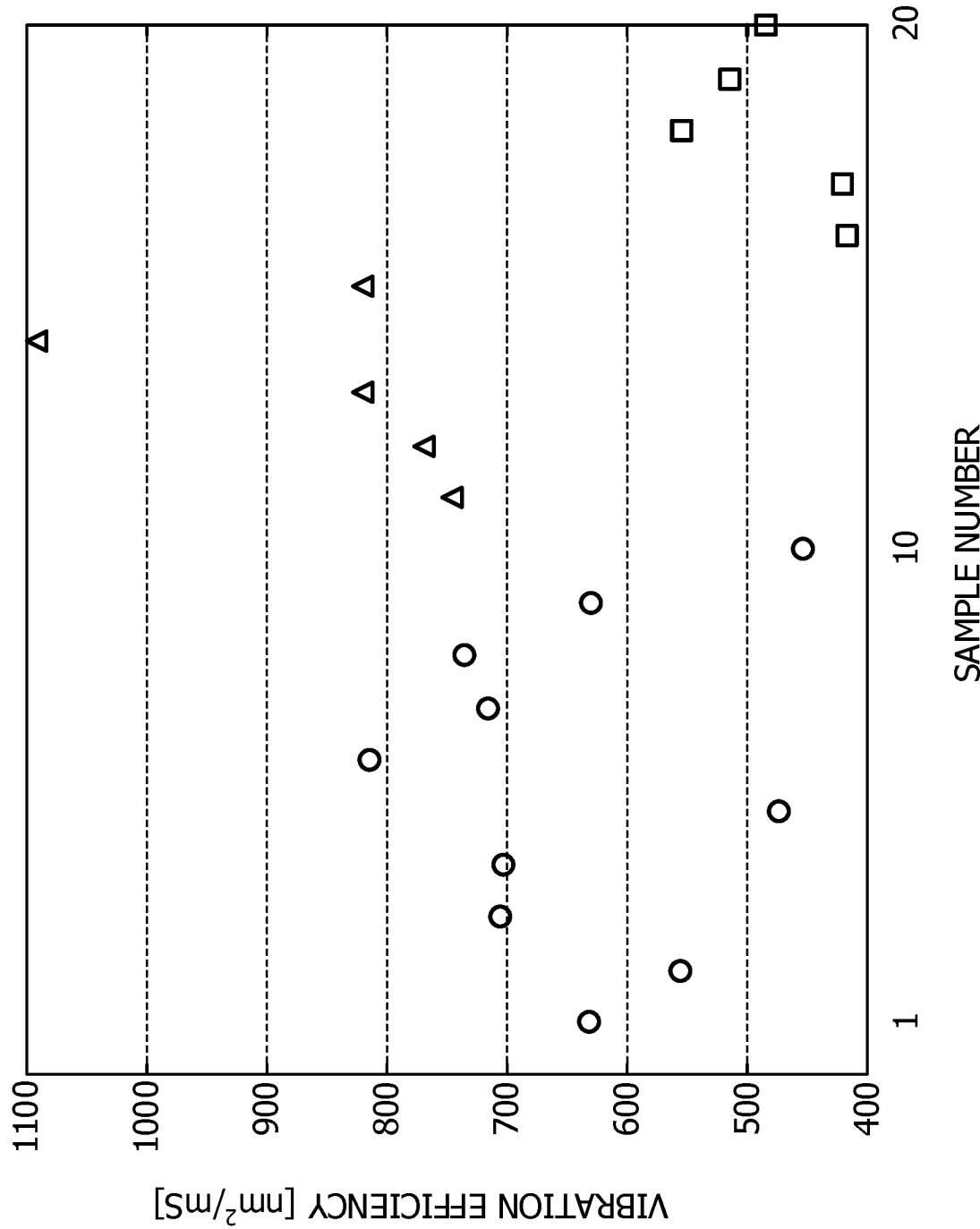
FIG. 15 is a graph illustrating results of actual measurement of vibration efficiency on the top panel.

FIG. 15 is a graph illustrating results of actual measurement of the vibration efficiency on prototyped twenty top panels 120. In FIG. 15, the horizontal axis represents sample numbers of the prototyped twenty top panels 120, and the vertical axis represents the vibration efficiency.

The twenty top panels 120 include a top panel 120 to which the vibrating element 140A is attached toward the first (n=1) antinode from the end on the Y-axis negative direction side (d=0), a top panel 120 to which the vibrating element 140A is attached toward the position shifted by 0.5 mm on the Y-axis negative direction side with respect to the position of the first antinode (d=+0.5 mm), and a top panel 120 to which the vibrating element 140A is attached toward the position shifted by 0.5 mm to the Y-axis positive direction side with respect to the first antinode (d=−0.5 mm).

FIG. 15 illustrates the top panel 120 of d=0 mm by a circle marker, the top panel 120 of d=+0.5 mm by a solid triangle marker, and the top panel 120 of d=−0.5 mm by a square marker. The shift amount d is a target value.

The top panels 120 of d=+0.5 mm are gathered at to place where the vibration efficiency is high, and the top panels 120 of d=−0.5 mm are gathered at a place where the vibration efficiency is low, as compared with the top panel 120 of d=0 mm.

From such results, in the embodiment, to provide the top panel 120 having high vibration efficiency, the attaching position $\Delta Y$ of the vibrating element 140A or 140B is set to a position shifted to the Y-axis negative direction side of the top panel 120 (to the outer side of the top panel 120) by the distance +d from the position Yn of the n-th antinode.

To provide the top panel 120 having high vibration efficiency, it is desirable to hold d≥ε, where the target value of the shift amount when the vibrating element 140A is attached to the position shifted on the Y-axis negative direction side (to the outer side of the top panel 120) with respect to the antinode position is d, and a position error in the Y-axis direction when the vibrating element 140A is attached to the top panel 120 is ±ε. Note that +ε is an error of when shifted in the Y-axis negative direction with respect to the target value d, and −ε is an error when shifted in the Y-axis positive direction with respect to the target value d.

By shifting the attaching position of the vibrating element 140A to the Y-axis negative direction side (to the outer side of the top panel 120) from the position Yn of the n-th antinode by the target value d of the shift amount that satisfies d E, as described above, the vibration efficiency can be increased. Note that this similarly applies to the vibrating element 140B.

If the vibration efficiency can be increased, vibration having larger amplitude can be efficiently generated in the top panel 120 by driving the vibrating elements 140A and 140B with smaller power. If the vibration efficiency is high, the vibration that can be given to the user's fingertip can be efficiently increased, and the tactile property provided to the user's fingertip can be further improved.

Therefore, according to the embodiment, the electronic device 100 capable of providing a favorable tactile property can be provided.

Furthermore, in the above description, the mode of attaching the vibrating element 140A to the position shifted to the Y-axis negative direction side (to the outer side of the top panel 120) with respect to the antinode position in the case where both ends in the Y-axis direction of the top panel 120 are free ends has been described. However, even in the case where both ends in the Y-axis direction of the top panel 120 are support ends, the vibrating element 140A is similarly attached to the position shifted to the Y-axis negative direction side (to the outer side of the top panel 120) with respect to the antinode position.

Figure 16:
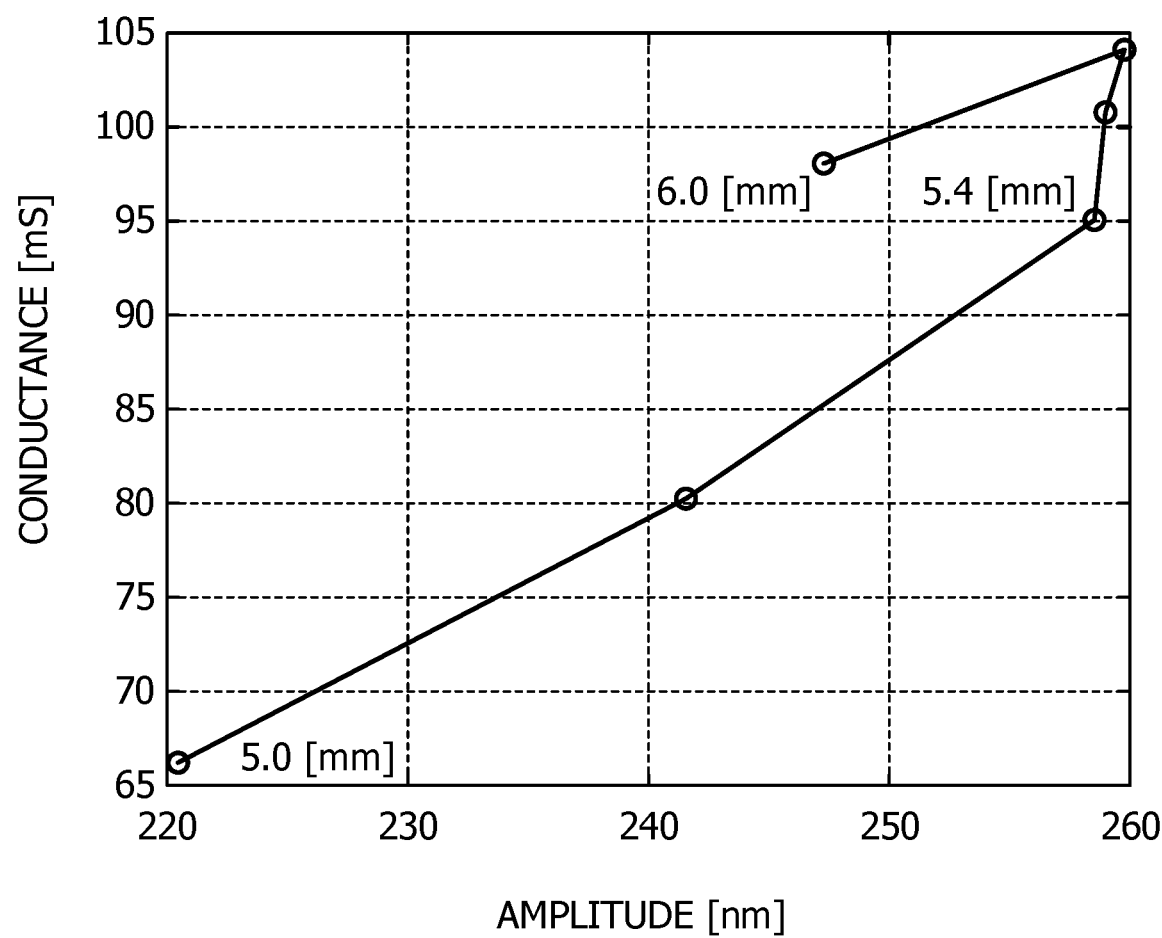
FIG. 16 is a simulation result indicating a relationship between amplitude of the natural vibration and conductance of the vibrating element in a case where both ends in a Y-axis direction of the top panel are free ends.
Figure 17:
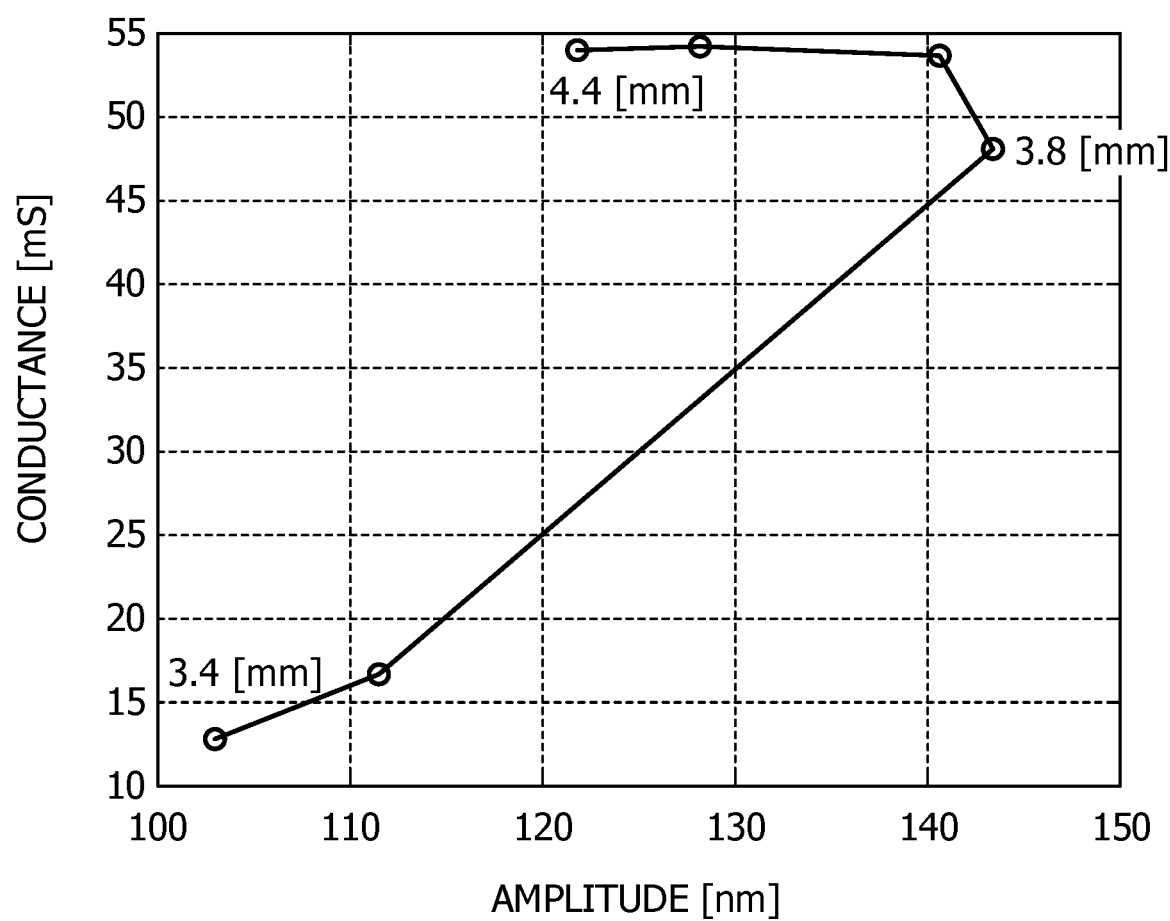
FIG. 17 is a simulation result indicating a relationship between amplitude of the natural vibration and conductance of the vibrating element in a case where both ends in the Y-axis direction of the top panel are support ends.

FIG. 16 is a simulation result indicating a relationship between amplitude of the natural vibration and conductance of the vibrating elements 140A and 140B in a case where both ends in the Y-axis direction of the top panel 120 are free ends. FIG. 17 is a simulation result indicating a relationship between amplitude of the natural vibration and conductance of the vibrating elements 140A and 140B in a case where both ends in the Y-axis direction of the top panel 120 are support ends.

In FIG. 16, the amplitude and the conductance are obtained for the top panels 120 having the position from the end on the Y-axis negative direction side of the top panel 120 to the center of the width in the Y-axis direction of the vibrating element 140A set to values from 5.0 mm to 6.0 mm by every 0.2 mm. In a case where the position of the vibrating element 140A is 5.4 mm, the center of the width of the vibrating element 140A coincides with the antinode position. Note that the position of the vibrating element 140B is a position having the same dimension from the end on the Y-axis positive direction side of the top panel 120.

As illustrated in FIG. 16, when the positions of the vibrating elements 140A and 140B are shortened from 5.4 mm to 5.2 mm and 5.0 mm, the conductance decreases. This indicates that the vibrating elements 140A and 140B efficiently vibrate with smaller power consumption as the positions of the vibrating elements 140A and 140B are located at outer sides with respect to the antinode position.

Furthermore, when the positions of the vibrating elements 140A and 140B become longer from 5.4 mm to 5.6 mm and 5.8 mm, the conductance sharply increases and the amplitude decreases when the position is 6.0 mm. This indicates that a larger power consumption is required as the positions of the vibrating elements 140A and 140B are located at inner sides with respect to the antinode position.

Furthermore, as illustrated in FIG. 17, in the case of support ends, the amplitude and the conductance are obtained for the top panels 120 having the position from the end on the Y-axis negative direction side of the top panel 120 to the center of the width in the Y-axis direction of the vibrating element 140A set to values from 3.4 mm to 4.4 mm by every 0.2 mm. In a case where the position of the vibrating element 140A is 3.8 mm, the center of the width of the vibrating element 140A coincides with the antinode position. Note that the position of the vibrating element 140B is a position having the same dimension from the end on the Y-axis positive direction side of the top panel 120.

As illustrated in FIG. 17, when the positions of the vibrating elements 140A and 140B are shortened from 3.8 mm to 3.6 mm and 3.8 mm, the conductance decreases. This indicates that the vibrating elements 140A and 140B efficiently vibrate with smaller power consumption as the positions of the vibrating elements 140A and 140B are located at outer sides with respect to the antinode position.

Furthermore, when the positions of the vibrating elements 140A and 140B become longer from 3.8 mm to 4.0 mm, the conductance sharply increases and the amplitude decreases when 4.2 mm or 4.4 mm. This indicates that a larger power consumption is required as the positions of the vibrating elements 140A and 140B are located at inner sides with respect to the antinode position.

As described above, similar tendency has been obtained in the cases where both ends in the Y-axis direction of the top panel 120 are free ends and are support ends. Therefore, to provide a favorable tactile property, it is favorable that the positions of the vibrating elements 140A and 140B coincide with the antinodes, or the positions of the vibrating elements 140A and 140B are located at the outer sides with respect to the antinode positions, even in the case where both ends in the Y-axis direction of the top panel 120 are support ends.

Note that, even if the vibrating elements 140A and 140B are attached to the top panel 120 using the target value d of the shift amount that satisfies d E, the position of the vibrating element 140A and/or 140B may be shifted to the center side (inner side) in the Y-axis direction of the top panel 120 with respect to the target position.

FIG. 18 is a diagram illustrating the natural vibration in the end portion on the Y-axis negative direction side to which the vibrating element 140A is mounted, of the top panel 120, in a modification of the embodiment.

In a case where the position where the vibrating element 140A and/or 140B is attached to the top panel 120 is shifted to a center side (inner side) of the top panel 120 in the Y-axis direction with respect to a target position, the position of the vibrating element 140A is shifted to the center side (inner side) of the top panel 120 in the Y-axis direction with respect to the position of an antinode, as illustrated in FIG. 18(A).

In such a case, a wavelength adjusting member 180 extending the wavelength of the natural vibration of the top panel 120 is simply attached to the top panel 120. It is sufficient that the position where the wavelength adjusting member 180 is attached is an outer side of the top panel 120 in the Y-axis direction with respect to the target antinode, or the position of a target antinode. Note that, in a case where the position where the wavelength adjusting member 180 is attached is the position of the target antinode, the center of the width in the Y-axis direction of the wavelength adjusting member 180 is coincident with the position of the target antinode.

When the wavelength adjusting member 180 having high rigidity is attached to an end side with respect to the position of the target antinode of the top panel 120 to extend the wavelength of the natural vibration in the section where the wavelength adjusting member 180 of the top panel 120 is attached, the position of the antinode is relatively shifted to the center side (inner side) in the Y-axis direction of the top panel 120. Therefore, the position where the vibrating element 140A or 140B is attached can be corrected to an outer side in the Y-axis direction of the top panel 120 with respect to the target antinode.

A displacement amount Y1 of the position of the antinode is roughly calculated by Expression (9) on the assumption that the waveform is not changed but is affected by the sound velocity change rate c in the section where the wavelength adjusting member 180 is attached.

[Math. 9]

$$Y1 = \left(1 - \frac{1}{c}\right)w \quad (9)$$

As the material of the wavelength adjusting member 180 having high rigidity, a material having high specific rigidity is suitable. Y1 becomes nearly 0.4 mm in a case of an aluminum alloy having the Young's modulus of 71 GPa, the thickness of 0.2 mm, the density of 2700 kg/m$^3$, and the width in the Y-axis direction of 4 mm, for example.

Note that, here, a mode of attaching the wavelength adjusting member 180 to the top panel 120 in the case where the position of the vibrating element 140A and/or 140B is shifted to the center side (inner side) in the Y-axis direction of the top panel 120 with respect to the target position has been described.

However, when the above-described wavelength adjusting member 180 is attached to the top panel 120, the wavelength of the natural vibration can be extended. Therefore, use of the wavelength adjusting member 180 is not limited to the case where the position of the vibrating element 140A and/or 140B is shifted to the center side (inner side) in the Y-axis direction of the top panel 120 with respect to the target position, and the wavelength adjusting member 180 may be used as an adjusting member for extending the wavelength of the natural vibration and attached to the top panel 120 to improve the vibration efficiency.

Although the electronic device according to exemplary embodiment of the present invention has been described above, it should be understood that the present invention is not limited to the embodiments disclosed in detail, and the various changes and alterations could be made hereto without departing from the scope of claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An electronic device comprising:
a top panel having an operation surface;
a position detection circuit configured to detect a position of an operational input performed on the operation surface;
a vibrating element mounted to the top panel and configured to generate vibration in the operation surface; and
a drive control circuit configured to drive the vibrating element by a drive signal for generating natural vibration in an ultrasonic band in the operation surface, and configured to drive the vibrating element such that intensity of the natural vibration changes according to the position of the operational input on the operation surface and a degree of temporal change of the position of the operational input, wherein a position of the vibrating element mounted to the top panel is offset on an outer side of the top panel with respect to a position of an antinode included in one section of sections of a plurality of cycles respectively including a plurality of antinodes of a standing wave generated in the top panel by the natural vibration, and an amount of the offset is equal to or less than Y−d, where a distance from an end on the outer side of the top panel to the antinode included in the one section is Y, an error of a mounting position in a case where the vibrating element is arranged on the outer side of the top panel with respect to the antinode included in the one section is −d, and an error of a mounting position in a case where the vibrating element is arranged on an inner side of the top panel opposite to the outer side of the top panel with respect to the antinode included in the one section is +d, wherein the amount of the offset is a value of an integral multiple of a standard deviation of a length from the end on the outer side of the top panel to the mounting position of the vibrating element.

2. The electronic device according to claim 1, wherein the one section is a section located on an outermost side of the sections of a plurality of cycles of a standing wave generated in the top panel.

3. The electronic device according to claim 1, further comprising:

a wavelength adjusting member mounted to the top panel at the position of the antinode included in the one section or at a position on the outer side with respect to the antinode included in the one section, and configured to extend a wavelength of the standing wave.

4. The electronic device according to claim 1, wherein the vibrating element is a rectangular vibrating element having a short side in a direction in which amplitude of the natural vibration generated in the top panel changes in plan view.

5. An electronic device comprising:
a top panel having an operation surface;
a position detection circuit configured to detect a position of an operational input performed on the operation surface;
a vibrating element mounted to the top panel and configured to generate vibration in the operation surface;
a drive control circuit configured to drive the vibrating element by a drive signal for generating natural vibration in an ultrasonic band in the operation surface, and configured to drive the vibrating element such that intensity of the natural vibration changes according to the position of the operational input on the operation surface and a degree of temporal change of the position of the operational input; and
a wavelength adjusting member mounted to the top panel, wherein a position of the vibrating element mounted to the top panel is offset on an inner side of the top panel with respect to a position of an antinode included in one section of sections of a plurality of cycles respectively including a plurality of antinodes of a standing wave generated in the top panel by the natural vibration, and the wavelength adjusting member extends a wavelength of the standing wave so that an amount of the offset is equal to or less than Y−d, where a distance from an end on an outer side of the top panel opposite to the inner side of the top panel to the antinode included in the one section is Y, an error of a mounting position in a case where the vibrating element is arranged on the outer side of the top panel with respect to the antinode included in the one section is −d, and an error of a mounting position in a case where the vibrating element is arranged on the inner side of the top panel with respect to the antinode included in the one section is +d.

* * * * *